US007625622B2

(12) United States Patent
Teckoe et al.

(10) Patent No.: US 7,625,622 B2
(45) Date of Patent: Dec. 1, 2009

(54) POWDER COMPACTION AND ENROBING

(75) Inventors: Jason Teckoe, Ely (GB); Colin Merwood, Havant (GB); Michael Dann, Pinner (GB); Stephen Ronald Kessel, Warboys (GB); Ian Povey, Stamford (GB); Martin Good, Ruislip (GB)

(73) Assignee: Bioprogress Technology Limited, Cambridge (GB)

( * ) Notice: Subject to any disclaimer, the term of this patent is extended or adjusted under 35 U.S.C. 154(b) by 74 days.

(21) Appl. No.: 10/949,136

(22) Filed: Sep. 24, 2004

(65) Prior Publication Data

US 2005/0147710 A1 Jul. 7, 2005

(30) Foreign Application Priority Data

Sep. 24, 2003 (GB) ................................ 0322358.3

(51) Int. Cl.
*B29C 43/08* (2006.01)

(52) U.S. Cl. ....................... 428/112; 425/112; 425/127; 425/225; 425/345; 425/503

(58) Field of Classification Search ................. 425/123, 425/127, 210, 225, 78, 345, 353–355, 387.1, 425/388, 324.1, 503–504, 515, 112, 289, 425/121; 264/255

See application file for complete search history.

(56) References Cited

U.S. PATENT DOCUMENTS

| | | | | |
|---|---|---|---|---|
| 2,886,849 A * | 5/1959 | Brierley | 425/89 |
| 3,096,248 A | 7/1963 | Rudzki | |
| 3,677,673 A | 7/1972 | Shapiro | |
| 4,325,734 A * | 4/1982 | Burrage et al. | 425/78 |
| 4,983,247 A * | 1/1991 | Kim | 264/255 |
| 5,074,102 A * | 12/1991 | Simpson et al. | 53/454 |
| 5,419,864 A * | 5/1995 | Sheer et al. | 264/255 |
| 5,603,880 A * | 2/1997 | Kato et al. | 264/112 |
| 5,682,733 A | 11/1997 | Perrone | |
| 6,071,456 A * | 6/2000 | Hanamoto et al. | 425/112 |
| 6,227,836 B1 | 5/2001 | Kato et al. | |
| 6,837,696 B2 * | 1/2005 | Sowden et al. | 425/112 |
| 2003/0070903 A1 | 4/2003 | Sowden et al. | |

FOREIGN PATENT DOCUMENTS

| | | |
|---|---|---|
| EP | 0 691 121 A2 | 1/1996 |
| EP | 0691121 | 1/1996 |
| EP | 1 149 689 A2 | 10/2001 |
| EP | 1149689 | 10/2001 |
| WO | WO03/000485 | 1/2003 |
| WO | WO03/020246 | 3/2003 |
| WO | WO 03/020246 A1 | 3/2003 |

OTHER PUBLICATIONS

International Search Report (PCT/GB2004/04092).
PCT Written Opinion (PCT/GB2004/04092).
International Search Report PCT/GB2004/004097.
Written Opinion of The International Searching Authority PCT/GB2004/004097.
European Search Report for European Application No. EP 08 10 0743, dated Feb. 19, 2008, 11 pages.

* cited by examiner

*Primary Examiner*—Yogendra Gupta
*Assistant Examiner*—Thu Khanh T Nguyen
(74) *Attorney, Agent, or Firm*—McDermott Will & Emery LLP

(57) ABSTRACT

An apparatus and method is disclosed for forming a compacted powder slug coated with a film. The powder, e.g. of a medicament, is compacted and enrobed to produce compacted powder slugs by preferably mechanically compacting a powder and forming a film of a material, preferably hydroxy propyl methyl cellulose, by vacuum or pressure differential, about the surface of the powder thus compacted.

15 Claims, 30 Drawing Sheets

POWDER COMPACTION AND ENROBING

FIELD OF THE INVENTION

This invention concerns the compacting of powder e.g. a powder containing a medicament, vitamin, dietary supplement etc, and such compacted powder being enrobed by a biodegradable and/or water soluble film, for example a non-gelatin film, such as hydroxypropyl methyl cellulose (HPMC), to produce encapsulated bodies of compacted powder, suitable for dosage forms, e.g. for human ingestion. The invention is applicable to all related dosage forms, including tablets, but for simplicity all such forms will be generally referred herein as capsules.

BACKGROUND TO THE INVENTION

Tablets are a common type of dosage form and various means for improving their properties have been tried. Current methods for coating tablets, such as pharmaceutical tablets include the using of acelacoaters or pan coaters, which spray low molecular weight HPMC grades onto tablets so imparting a surface layer, which is uniform and smooth, but opaque and low gloss. It is possible for the tablets to have embossed lettering on them. This method of coating tablets is however time consuming and requires a high level of expertise to produce satisfactory results. Production complications such as tablet twinning are common, where two tablets become attached to one another during the spray coating operation. In addition to these problems it is necessary to compact the tablets under relatively high pressures so that they do not disintegrate during the coating process. This high level of compaction can have an adverse effect on the disintegration and dissolution rates of active ingredients contained within the capsule, for example, leading to a delay in the release of a drug to a patient, whilst the tablet slowly dissolves in the stomach of the patient.

An alternative to spray or pan coating is to use two-piece hard capsules. These are produced by a dipping process, typically a HPMC solution is used, producing half shells which interlock and thus produce an enclosed capsule. These capsules are typically opaque but glossy, and cannot have any form of embossment, as this would interfere with the overlap interlocking process. The nature of the capsule dictates that there will always be an airspace above the powder fill level. Additionally, it is not possible to compact the powder into these tablets, and this so limits the quantity of powder which can be encapsulated. It follows that this lack of compaction can effectively reduce the amount of e.g. medicament which can be encapsulated. The existence of the air space in the capsule and lack of compaction of the powder contained within the capsule leads to a capsule that is inevitably larger than necessary.

It has also been found that, after manufacture and/or sale of two-piece hard capsules, the capsules can be easily and illegally interfered with, as it is possible to separate the two halves of the capsule and tamper with its contents and replace the two halves back together without there being any obvious change in the capsule's external appearance such to suggest to the user that there was anything wrong with the capsule. This means that it can be difficult to detect capsules which have had their contents tampered with. HPMC and certain other non-gelatin materials are suitable for ingestion by humans, so delivery capsules with gelatin walls find potential use as ingestible capsules, e.g. for the delivery of accurately metered doses of pharmaceutical preparations and dietary supplements, as a possible replacement for gelatin based capsules. Conventional tablets have already been enrobed. See for example WO 02/098394.

SUMMARY OF THE INVENTION

An aspect of the invention provides an apparatus for forming a compacted powder slug coated with a film, comprising a platen having a pocket for receiving a vacuum formed film into the pocket and receiving a powder; and a mechanical means comprising a compression piston for compacting the powder in the pocket, the compression piston having a front face with a concave recess and a square edge around the circumference of the front face.

In an embodiment the pocket has a base formed by a lower piston, the lower piston having a front face with a concave recess and a square edge around the circumference of the front face. The front face of the lower piston further comprises at least two apertures to allow a vacuum to be formed in the pocket for vacuum forming the film. The platen further comprises an aperture to allow a vacuum to be formed between the platen and the film. An array of apertures are formed in the platen around the circumference of the pocket. The platen further comprises a recessed surface defining a raised edge forming the circumference of the pocket. The diametric clearance between the compression piston and the pocket is a fraction of the film thickness. The diametric clearance between the compression piston and the pocket is at most 35 micrometres. The diametric clearance between the lower piston and the pocket is a fraction of the film thickness. The diametric clearance between the lower piston and the pocket is at most 25 micrometres. The platen further comprises an array of pockets. A means for preconditioning the film for temporarily retaining and heating, the means for preconditioning comprising a heated plate having a surface with an array of apertures for forming a vacuum between the heated plate and the film may be provided in the apparatus. The apparatus may further comprise a gasket for receiving and retaining the compacted powder slug to transport and release the compacted powder slug to a desired location. The gasket may comprise an aperture with a receiving side for receiving the compacted powder slug and an exit side, the receiving side having a greater diameter than the exit side.

Another aspect of the invention provides an apparatus for forming a compacted powder slug coated with a film, comprising a film preconditioner for temporarily retaining and heating the film, said film preconditioner comprising a heated plate having a surface with an array of apertures for forming a vacuum between the heated plate and the film, a platen having a pocket for receiving said preconditioned film into the pocket under vacuum, and receiving the powder; and a mechanical means for compacting the powder in said pocket.

Another aspect of the invention provides an apparatus for forming a compacted powder slug coated with a film comprising a platen comprising an array of pockets for receiving a vacuum formed film into the pockets, said pockets receiving the powder, the platen comprising at least one aperture proximate to said pockets to allow a vacuum to be formed between the platen and the film; and a mechanical means for compacting the powder in said pocket. In an embodiment of the invention an array of apertures are formed in the platen around the circumference of the pocket.

An aspect of the invention provides an apparatus for forming a compacted powder slug coated with a film comprising a platen comprising an array of pockets for receiving a vacuum formed film into the pockets receiving the powder, the platen having a recessed surface between a plurality of raised edge profiles each forming a circumference of a pocket; mechanical means for compacting the powder in said pocket; and a cutting sleeve moveable to interfere with said raised edge profile to cut a film supported thereon.

In an embodiment, the apparatus may further comprise a turntable for holding the platen and transferring the platen during processing. The turntable may comprise four platens. The apparatus may further comprise a vacuum for cleaning the platen.

Another aspect of the invention provides an apparatus of any one of the preceding aspects/embodiments further comprising a dosator and a dosing unit for dosing the pocket with powder, the dosator comprising a powder hopper for holding the powder, and a dosing head having dosing tubes for retaining powder from the powder hopper and transferring the powder to the pocket. The dosing head may have tamping pins within the tubes for pre-compacting the powder in the dosing tubes and transferring the powder from the tubes into the pocket. In an embodiment the apparatus may have a dosing unit having the mechanical means for compacting, and a dosing sledge for receiving the powder from the dosing tubes of the dosing head and dosing the pockets with the powder, the sledge moveable from a charging position to a dosing position.

Another aspect of the invention provides an apparatus for forming a compacted powder slug encapsulated with a film comprising a platen having a pocket for receiving a first vacuum formed film into the pocket and receiving a powder; a dosing means for placing the powder in a position suitable for compaction of the powder in the pocket having the first vacuum formed film with powder; a compacting mechanical means for compacting the powder; a turntable for holding the platen and rotatable to transfer the platen from one station to another station during processing, a station for applying the film into the pocket of the platen and compacting the powder to partially enrobe the compacted powder, another station for applying a second vacuum formed film onto the partially enrobed compacted powder to completely coat the slug with film.

In an embodiment the dosing means places the powder proximate the pocket in a position suitable for compaction of the powder in the pocket having the first vacuum formed film with powder. The dosing means may dose the pockets having the first vacuum formed film with the powder.

In an embodiment the apparatus may compare a vacuum for cleaning the platen, and another station for cleaning the platen. The number of platens in the turntable may correspond to the number of stations in the apparatus. The turntable may comprise four platens for processing in another embodiment. The apparatus during said compaction may process comprise a means for isolating the compaction pressure forces from the turntable assembly.

Another aspect of the invention provides an apparatus for forming a compacted powder slug coated with a film, comprising a platen having a pocket for receiving a vacuum formed film into the pocket and receiving a powder a mechanical means for comprssing the powder in the pocket; and a gasket for receiving and retaining the comapcted powder slug to transport and release the compacted powder slug to a desired location. The gasket may comprise an aperature having a receiving side for receiving the compacted powder slug and an exit side, the receiving side having a greater diameter the exit side. The gasket may comprise an array of apertures for receiving more than one compacted powder slug.

One aspect of the invention concerns a novel method for compacting and enrobing a powder to produce capsules with enhanced properties.

A non gelatin film layer is thermoformed tablet shaped pocket under the influence of heat and/or vacuum, and/or pressure. A pre-determined mass of powder is dosed into the film formed pocket, and compressed into a tablet shape e.g. with the aid of a piston or pistons. A partially enrobed 'soft' tablet results from this process, which is then fully enrobed by a second sequence of events which involves the raising of the tablet above a platen which allows the remainder of the compressed tablet to be enrobed by a second film. Suitable tablet shaped pockets can be created by using e.g. a pair of pistons slideable within a cylinder, such pistons also having the advantage of being able to form pinch points between the platen and the top of cylinders which are useful for cutting away unwanted excess film from the (partially) enrobed tablets.

One of the aims of the present invention is to produce tamper evident capsules.

Another aim of the present invention is to produce powder filled capsules whereby the powder is enrobed with a material which may or may not form a 'skin tight wrap'.

Another aim of the present invention is to produce a capsule with a high gloss surface which is able to adopt an underlying embossment, e.g. to identify a pharmaceutical tablet.

Another aim of the present invention is to produce capsules which have a flange which is almost non-discernable.

Another aim of the present invention is to enable the production of dosage forms in a wide variety of shapes and sizes, which, because of the nature of the processes involved and the properties of the product produced, includes shapes and sizes of dosage forms which have not been previously possible to make or practical to use.

Another aim of the present invention is to produce capsules with favourable properties and which contain powder or other flowable solid material which is at a favourable state of compaction and/or composition, and/or the encapsulating medium of the capsule being fast dissolving or dissolvable (with control) pharmaceutical grade films plasticised with pharmaceutical grade materials.

Another aim of the present invention is to produce capsules, which by their nature, are easy to swallow, and more easily can be conveyed to the site where it is desirable where the active ingredients are most advantageously released.

Another aspect the present invention is a method of powder compaction to produce powder compacted slugs, which, for example can be enrobed to produce capsules which possess enhanced disintegration and dissolution properties over and above traditional tablets.

Another aspect of the present invention is a method of producing a capsule, which, at the very least can perform the same function as a conventional coated tablet, but in which the conventional tablet pressing and coating stages are replaced by a single powder enrobing process.

Another aspect of the present invention is a method of producing a capsule by enrobing powder, in which, because of the nature of capsule produced, certain ancillary ingredients necessary in conventional tablet production, can be omitted. For example, ingredients in a tablet which are added to give structural integrity can be omitted, because the active ingredients are in powder form, relatively loosely compacted are encapsulated within a film, such film which now securely packages the powder/ingredients, thus giving integrity and forming a discrete effective dosage form. Because of the aforementioned, components contained within a tablet which are designed to disperse and break up the tablet when it has reached the site of delivery, can be omitted, as the active ingredients in the capsule according to the present invention are in a non-compacted or at least less compacted form as compared to a conventional tablet, and this lesser compaction leads to the easy release and dispersal of active ingredients once the capsule film has dissolved, e.g. at the intended site of delivery.

Another aspect of the invention provides a method of enrobing compacted powder, comprising vacuum forming a film into a pocket compacting a powder in said pocket, resulting in a partially enrobed powder slug in a pocket. Vacuum forming a second film over this powder slug to completely enrobe the powder slug, forms a discrete compacted powder filled capsule, suitable for use as a dosage form.

In yet another aspect of the present invention provides a method of enrobing compacted powder using film or films, to form a compacted powder filled capsule, wherein the film or films forming the wall of the compacted powder filled capsule used overlap each other.

In a further aspect of the present invention provides a method of forming and/or enrobing a compacted slug wherein the level of compaction of the compacted powder is less than that necessary to reach the industry standard for the discrete slug of compacted powder to be described as a tablet.

In practising the method of the invention, the films are caused to deform to conform with the external surface of the pocket and the compacted powder slug, the films effectively forming a secure capsule, by being wrapped around the powder slug. Vacuum chamber or vacuum bed apparatus, in which the films and powder are located in a suitably shaped support and exposed to conditions of vacuum (or substantially reduced pressure) can be modified and used for this purpose. Such apparatus may be based on commercially available vacuum chamber or vacuum bed apparatus, suitably modified. Vacuum forming techniques result in the compacted powder being completely enclosed and encapsulated within a film, leading to a capsule containing compacted powder, such capsule having enhanced and controllable properties over dosage forms currently available, such as conventional tablets.

The powders to be compacted are typically subjected to pressures between, but not limited to, 5-15 mega pascals. Examples of powders compacted and enrobed include paracetamol, ibuprofen, sorbital and multivitamin. Other powder fills which are contemplated are antacid, anti-inflammatory, anti-histamine antibiotic and anti-cholesterol drugs.

The film should be a material which is suitable for human consumption and that has sufficient flexibility and plasticity to be vacuum formable. Some film materials have suitable properties in their natural condition, but commonly it will be necessary to pre-treat the film material so that it is vacuum formable. For example, it may be necessary to expose the film material to a solvent therefor; for instance certain grades of polyvinyl alcohol (PVA) will vacuum form after application of a small amount of water to the surface thereof or when exposed to conditions of high humidity. A further generally preferred possibility, is to use a film of thermoplastic material (i.e. material capable of deforming on heating) with the film to be in heat-softened condition prior to being thermoformed by exposure to vacuum. Suitable thermoplastic materials include modified cellulose materials, particularly hydroxypropyl methyl cellulose (HPMC) and hydroxypropyl cellulose (HPC), polyvinyl alcohol (PVA), polyethylene oxide (PEO), pectin, alginate, starches, and modified starches, and also protein films such as soya and whey protein films. The currently preferred film material is HPMC. Suitable film materials are currently available.

When using thermoplastic film, the film is typically heated prior to application to pocket or compacted powder slug, so that the film is in a heat softened deformable condition. This can be achieved by exposing the film to a source of heat e.g. an infrared heater, infrared lamps, a heated plate a hot air source etc. In the process described, a range of temperatures may be used, but by way of example only, where films of different thickness may be utilized far the first and second films in the process, a first film forming temperature of around 150 degrees centigrade may be used and for the second film forming stage, a range of approximately 70-80 degrees centigrade may be used.

During the enrobing process, films may be caused to overlap, preferably a minimum of 1.5 mm-2 mm. Compacted powder slugs may preferably have a sidewall height of about 3 mm and films may be caused to overlap substantially completely over the sidewall area.

The film material may include optional colourings, e.g. in the form of food dyes such as FD and C yellow number 5, and/or optional flavourings, e.g. sweeteners, and/or optional textures etc in known manner.

The film material typically includes plasticiser to give desired properties of flexibility to the film in known manner. Materials used as plasticisers include alpha hydroxy as lactic acid and salts thereof, maleic acid, benzyl alcohol, certain lactones, diacetin, triacetin, propylene glycol, glycerin or mixtures thereof. A typical thermoplastic film formulation is HPMC 77% by weight, plasticiser 23% by weight.

The film suitably has a thickness in the range 20-200 microns, conveniently 50 to 100 microns, e.g. at about 80 microns, with appropriate film thickness depending on factors including the size and form of the tablet. Films of different thickness may be used, e.g. a film of greater thickness may be used in the first stage of the enrobing process, say 125 microns thickness and a film of lesser thickness may be used in the second stage of the enrobing process, say 80 microns thickness.

Because of the nature of the film forming process according to the present invention, under certain circumstances, e.g. where the powder to be compacted contains particles which, under compaction, have the ability to pierce film, it may be advantageous to have the thickness of the film formed in the pocket to be greater than that of the film which is to cover the remainder of the compacted powder slug (in the second and final phase of enrobement of the compacted powder). Such differential thickness may give rise to certain advantageous structural features of the resultant capsule; the capsule my be generally more robust and so may be more safely stored and handled (generally thicker film on the capsule), but such capsule also possessing a smaller area (window) of weaker, thinner film which can give rise to quicker release characteristics by the thinner film wall dissolving more quickly when exposed to any given solvent. An advantageous differential film thickness to form a capsule with wall of different thickness, could be e.g. 70/90 micron film coordination to produce capsules which are robust but which release their contents quickly, through a window of thinner film.

Therefore films of different thickness may be used in the enrobing process, and to give a further examples, a film of greater thickness may be used in the first stage of the enrobing process, a maximum of 200 microns and a minimum of 70 microns but say preferably 125 microns thickness and a film of lesser thickness may be used in the second stage of the enrobing process, a maximum of 125 microns and a minimum of 50 microns, but say preferably 80 microns thickness.

When making multiples of enrobed compacted powder slugs, the spacing of the compacted powder slugs can be important. If the compacted powder slugs are positioned too closely together, the film is not able to fully thermoform between them. For example, a spacing between the adjacent compacted powder slugs of about 4 mm has been found to give good results, the film being able to fully adopt the vertical sidewall of the compacted powder slug to a distance of about 2 mm before it begins to curve away from the side of the compacted powder slug.

According to one aspect of the invention, the method involves forming two separate overlapping half coatings of film, effectively on the compacted powder slug. The method preferably involves, first forming a film in a pocket, then compacting a powder slug into the film lined pocket, thereby effectively coating/encapsulating a substantial portion of a powder slug within a film formed into a partial capsule, removing the remaining film material not coating the compacted powder slug e.g. by cutting, then coating half of the compacted powder slug, with overlapping portions of the two coatings sealed together to provide a sealed complete enclosure for the slug, and again removing remaining surplus film material not coated on the slug. It may be necessary to apply adhesive material between the overlapping film coatings e.g. to the surface of the film layers, to ensure the formation of an effective seal therebetween and to make the resultant capsule tamper-evident. The adhesive material conveniently has the same composition as the film, but with a greater proportion of plasticiser, e.g. 93% to 98% by weight plasticiser, so as to provide a less viscous material. The adhesive material may be applied, e.g. by use of a roller, spraying etc. A typical adhesive formulation, with % representing % by weight, is HPMC 4%, lactic acid 77%, water 19%.

The compacted powder slug and capsule conveniently include a generally cylindrical side wall portion, with two half coatings overlapping on this side wall. Tablets of circular symmetrical form with a circular cylindrical side wall are very common, but other forms e.g. generally oblong and oval, again including a generally cylindrical side wall, are also known.

It may be also advantageous or desirable to apply adhesive material e.g. as described above, to the surface of compacted powder slug prior to the final stage of coating, to promote adhesion of the second portion of the film thereto. Again, this may be achieved by e.g. use of a roller, spraying etc.

A plurality of tablets in an array may be conveniently coated simultaneously, using a suitably large sheet of film material.

BRIEF DESCRIPTION OF THE DRAWINGS

Embodiments of this invention are now further described in detail, by way of example only, with reference to the drawings in which:

FIG. 7C shows plain view of a front face of the lower piston, FIGS. 7D and E show cross-sectional views of the piston taken along Y-Y and X-X as shown in FIG. 7C, and FIG. 7F shows the section indicated by dashed circle in FIG. 7B in more detail of the concave shape in front face of piston and square edges;

FIG. 8B shows the section indicated by dashed circle in FIG. 8A in more detail of the recessed surface around the cavities and raised edge around cavities, also the vacuum holes around the cavities;

FIG. 9B shows the section indicated by dashed circle in FIG. 9A of the raised edges around the cavities;

FIG. 13B shows a cross-sectional view of the shaft with vanes of FIG. 13A;

FIG. 14B shows a cross-sectional view of the dosator, dosing and compaction units of FIG. 14A taken along X-X of FIG. 14A;

FIG. 15C shows the section indicated by dashed circle in FIG. 15A;

FIG. 16B shows a cross-sectioned view of the dosator, dosing and compaction units of FIG. 16A taken along X-X of FIG. 16A;

FIG. 17B shows a perspective view of the underside of the assembled unit of the thermoformer of FIG. 17A;

FIG. 19B shows the dosator powder bowl shown in FIG. 19A in more detail and FIG. 19C shows the dosator head shown in FIG. 19A in more detail;

FIG. 20B shows a dosing unit shown in FIG. 20A in more detail, and FIG. 20C shows the dosator dosing head shown in FIG. 19C charging the dosing unit shown in FIG. 20B;

DETAILED DESCRIPTION

The drawings show the various stages of a powder compaction/enrobing process.

Figure 1:
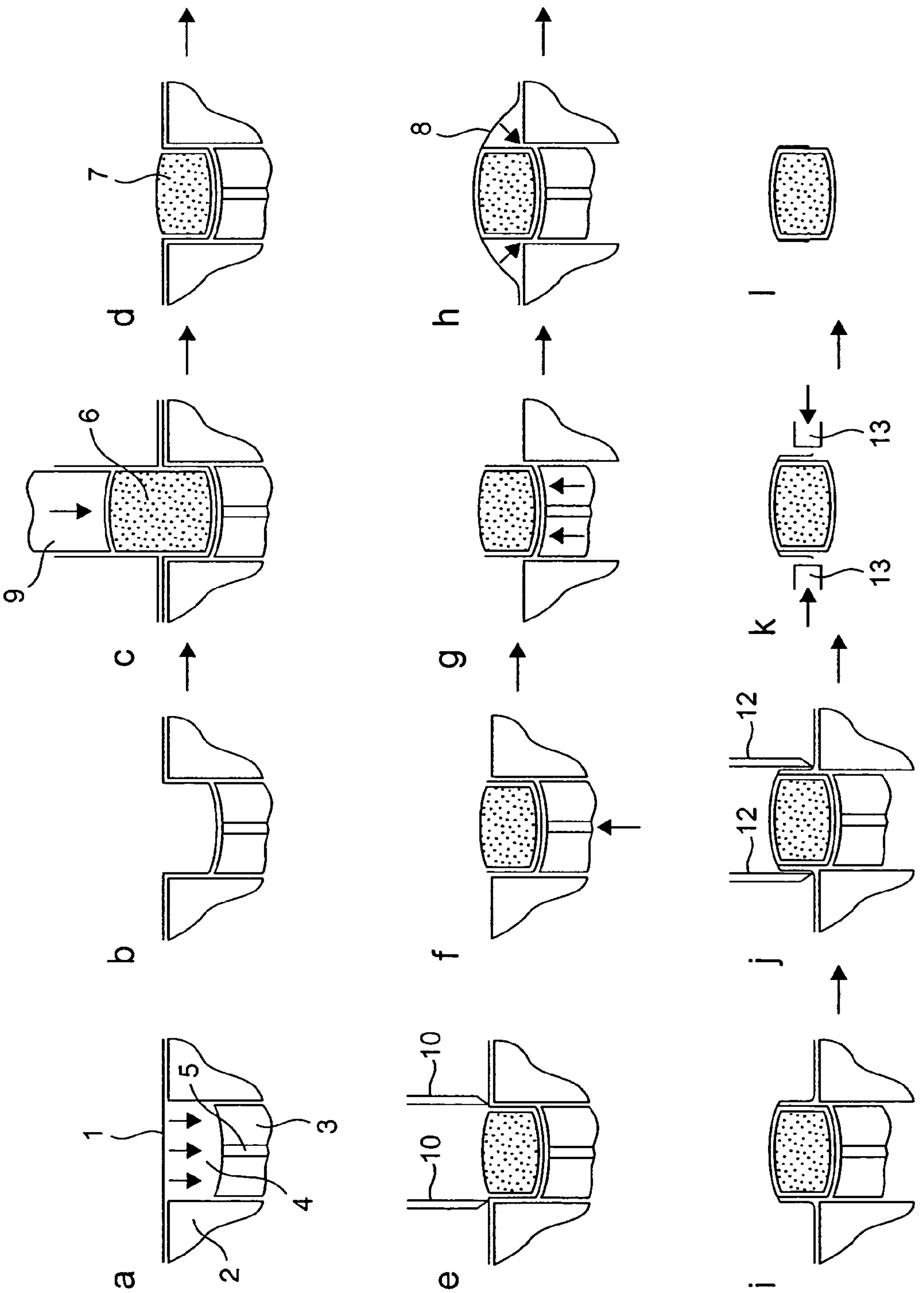
FIG. 1 shows in steps a-l the basic compaction and enrobing apparatus and process in accordance with an embodiment of the invention.

FIG. 1 shows the mechanism of the basic steps of powder compaction and enrobement via steps a-l:

a. A first film (1) is laid upon a platen (2). Lower piston (3), slideable in cylinder (4) incorporates vacuum port (5).
b. Film (1) completely drawn down into cylinder (4) by a vacuum created by vacuum port (5) and said film (1) also resting on the crown of lower piston (3), to form a pocket shape.
c. A quantity of powder (6) is introduced over the pocket of film and upper piston (9) moves downward towards the lower piston (3) compressing a quantity of powder (6).
d. A compacted powder slug (7) resulting from the completion of step c.
e. Cutting of film by the introduction of cutting tool (10) to form an isolated semi enrobed slug of compacted powder.
f. Lower piston (3) begins to move upwards, thereby also urging compacted powder slug (7) upwards.
g. Lower piston (3) comes to rest, positioning compacted powder slug (7) proud of platen (2).
h. Introduction of a second film (8) over platen (2) and also loosely stretching over compacted powder slug (7)
i. Second vacuum is applied drawing second film (8) around and closely in association with the upper portion of compacted powder slug (7), second film (8) thereby wrapping itself around the upper part of the compacted powder slug (7).
j. Cutting tool (12) descending and trimming off excess unwrapped film from powder slug (7).
k. Fully enrobed powder slug, has been ejected from cylinder (4) by the further upward movement of lower piston (3) and has the loose ends of the films ironed and sealed by irons (13).
l. Shows a fully enrobed tablet with ironed seams.

Figure 2:
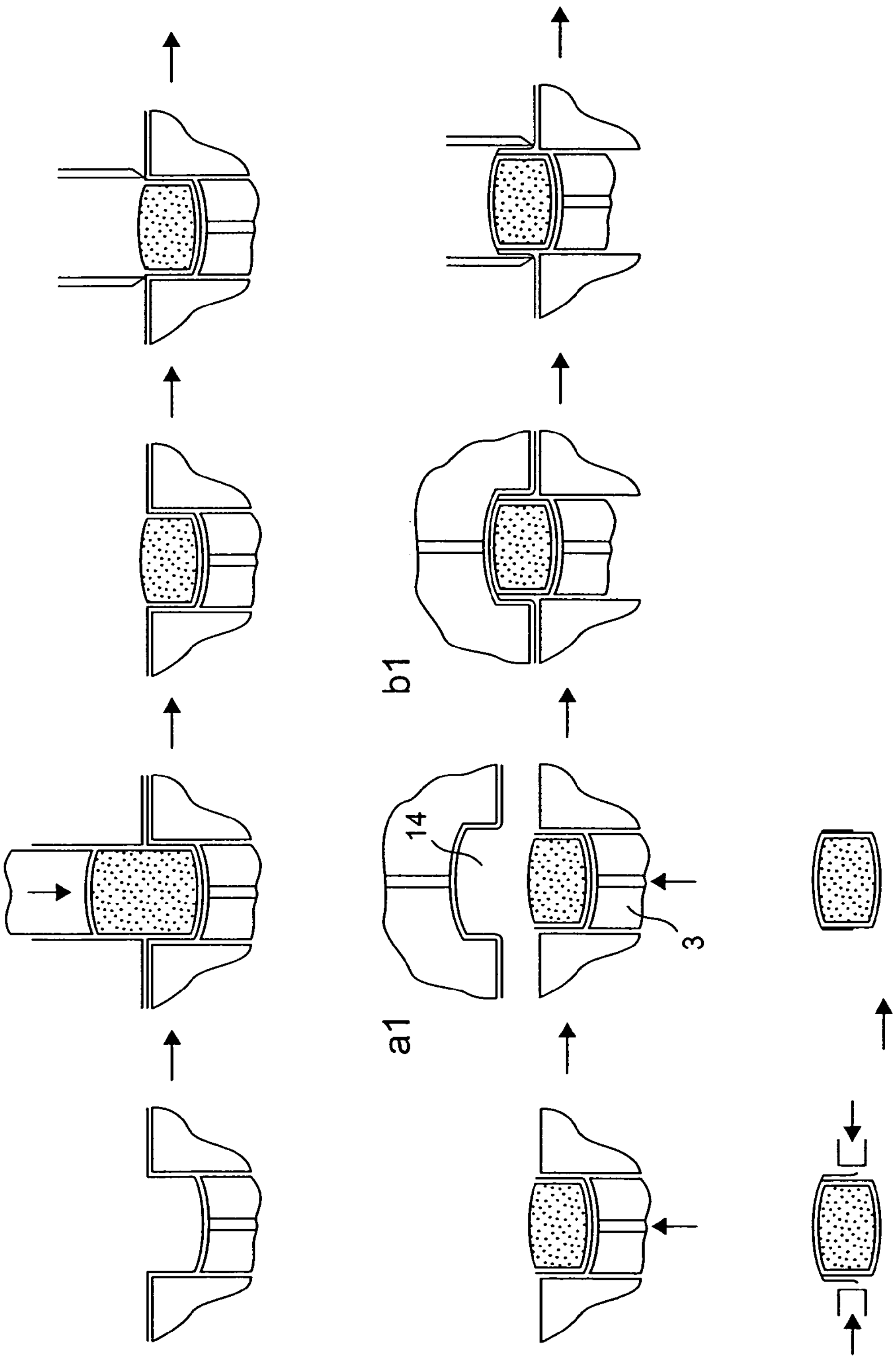
FIG. 2 shows a variation of the method shown in FIG. 1 with steps a1 and b1 in accordance with an embodiment of the invention.

FIG. 2 depicts a variation of the basic process described by FIG. 1.

Steps a1 and b1 show a second pre-formed film pocket, formed by a second vacuum forming pocket (14) being lowered onto the platen immediately above a partially enrobed powder slug as shown in step f of FIG. 1. Once the opposing film pocket is in position, lower piston (3) moves upwards thus pushing compacted partially enrobed powder slug also upwards and into the cavity of the second pre-formed film pocket, thus capping the partially enrobed powder slug to form a fully enrobed capsule, enrobed by two pockets of film. The capsule is then released, trimmed and ironed as mentioned previously.

Figure 3:
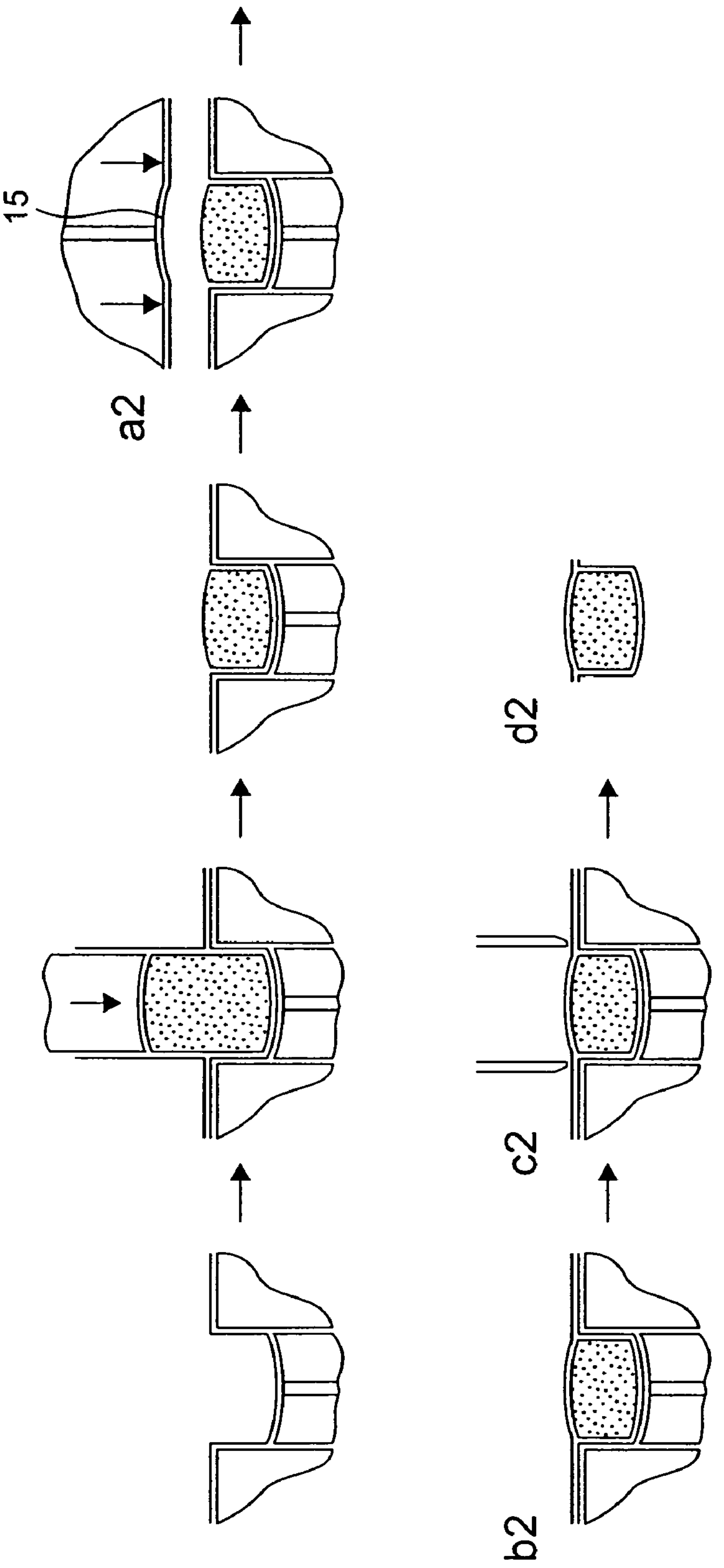
FIG. 3 shows a variation of the method shown in FIG. 1 with steps a2-d2 in accordance with an embodiment of the invention.

FIG. 3 depicts a further variation of the basic process described by FIG. 1.

Step a2 shows a powder slug as in step f of FIG. 1, and like FIG. 2 a second pre-formed film pocket is introduced, but this time it is a shallow pocket, formed by a second shallow vacuum forming pocket (15), such to only coat the top of the powder slug and to form a seal at the circumference of the very edge of the cylindrical portion of the powder slug. Steps a2-d2 show this revised process. This process gives rise to a capsule with a different type of seal which gives rise to different properties in the capsule.

Figure 4:
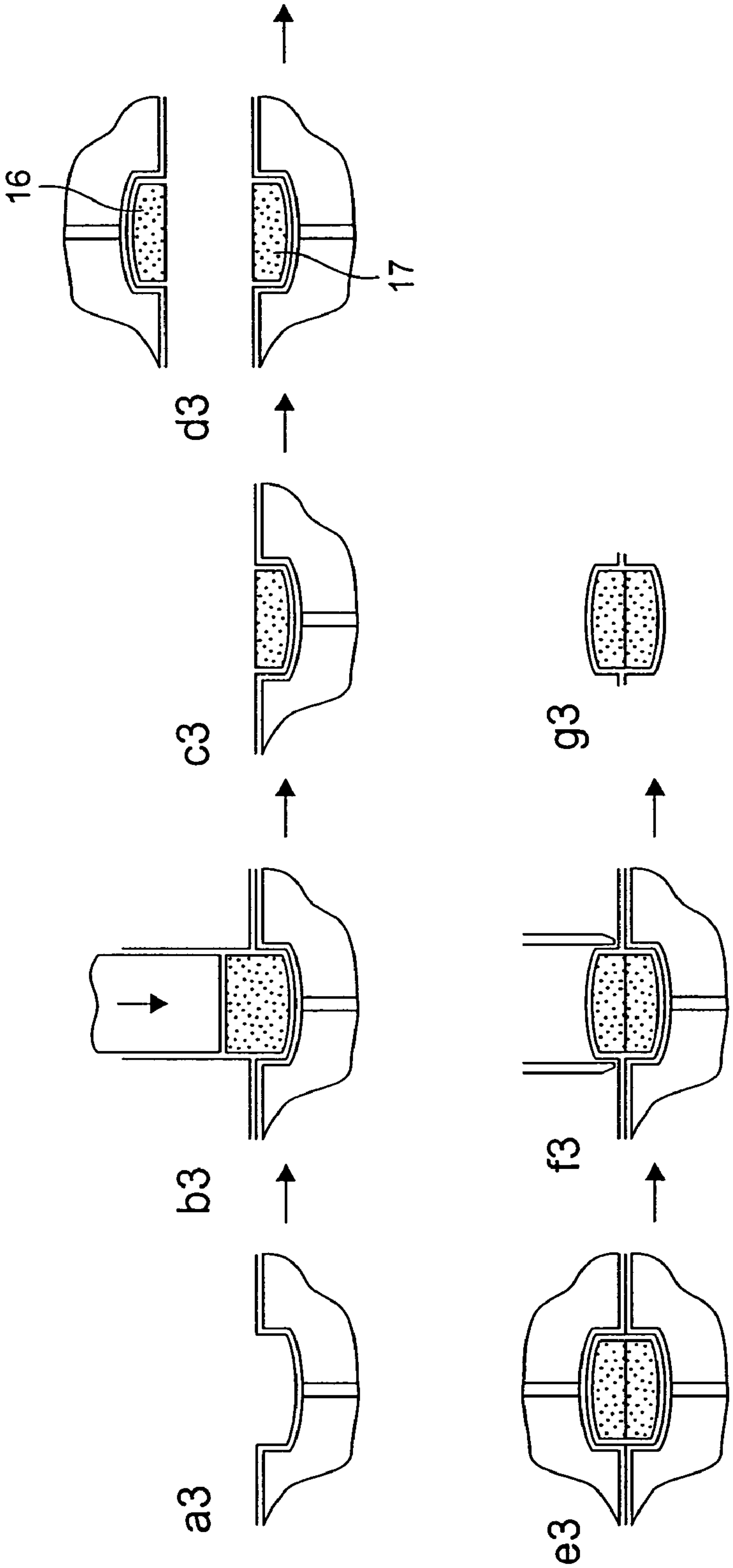
FIG. 4 shows a variation of the method shown in FIG. 1 with steps a3-g3 in accordance with an embodiment of the invention.
Figure 5A:
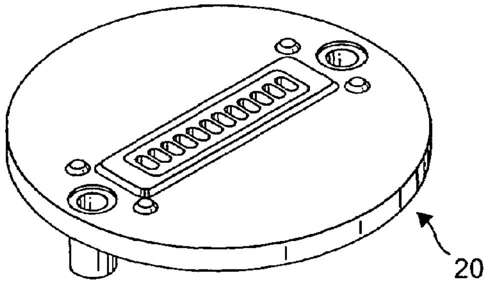
FIG. 5A-B shows a top view (filmside) and bottom view, respectively of a platen assembly in accordance with an embodiment of the invention.
Figure 5B:
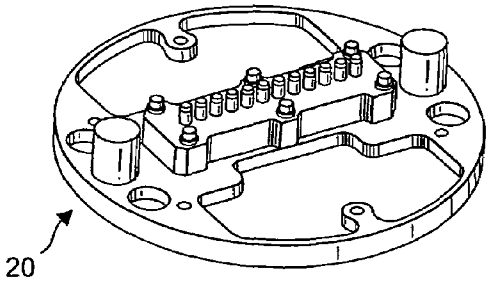
Figure 6A:
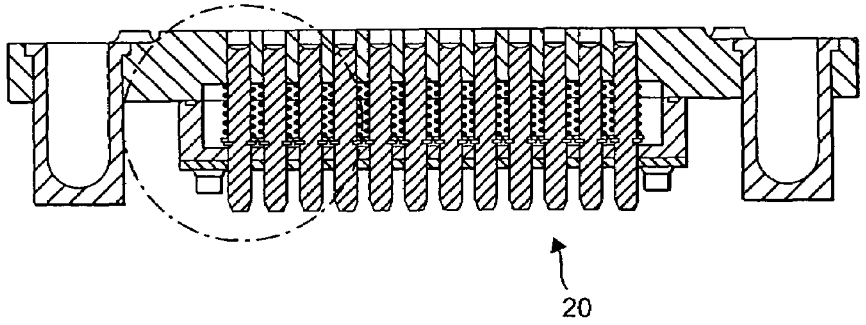
FIG. 6A-B FIG. 6A shows a cross-sectional view of the platen assembly of FIG. 5A taken along the arrow shown in FIG. 5A in accordance with an embodiment of the invention and FIG. 6B shows the section indicated by dashed circle in FIG. 6A in more detail.
Figure 6B:
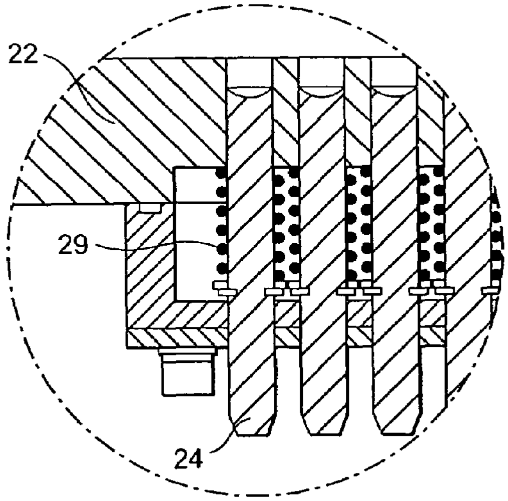

FIG. 4 depicts another variation of the process described by FIG. 1.

However the basic process is essentially duplicated to form a capsule which contains two distinct half doses of powder. The basic process as described in FIG. 1 is carried out up to step f, in duplicate, which is basically steps a3-c3 in FIG. 4. The main differences at this point in FIG. 4, are that the two opposing pockets filled with compacted powder (16,17) are half size in depth, and the top of the powder slugs are essentially flat, rather than rounded. Step c3 may include the laying down of an intermediate film on the surface of the half slug. Steps d3-f3 show the bringing together of 2 half slugs to form a single capsule, comprised of 2 parts. Step g3 shows a compartmentalized capsule. The advantages are at least 2 separate doses of active ingredients can be incorporated into 1 capsule, under perhaps different compaction pressures etc. This gives rise to further flexibility and options as to the performance of the new dosage forms.

The process described, and in conjunction with the quantity of powder used, with the careful positioning of the co-acting pistons during the compaction process, can facilitate the formation of powder slugs having various levels of compaction. As previously described, these varying levels of compaction are allowed in the powder slugs because the slugs are enrobed within a film, and it is this film enrobement which provides the slug with the necessary integrity it needs so that it can function as a convenient and stable dosage form. The process and apparatus can be modified such to produce capsules with varying properties, which have advantages over tablets and conventional capsules already known in the art. For example, a capsule according to an embodiment of the present invention containing a powder with a low compaction, could produce extremely favourable quick release characteristics, suitable, e.g. for a fast acting analgesic; the film can be both designed to be smooth/flexible, to allow the capsule to quickly and relatively painlessly travel to the intended site of drug delivery through the digestive tract, and also be designed to dissolve at or near the intended site of drug delivery. The lower compaction of the powder in the capsule can also aid smooth travel of the capsule in the digestive tract, as the contents of the capsule can be designed to be compressible and mobile, thus allowing the capsule to be bent and/or compressed as it travels through the body so that it can conform to the shape of a more restricted part of a passage, squeeze through it and so continue its journey through the digestive tract with less hindrance. Such dosage forms may find themselves especially useful where a patient finds difficulty in swallowing, has a painful or restricted digestive tract, or there is some other reason why a dosage form is required to be more mobile and less aggressive to the internals of the body.

The following methods are given by way of example and it is not intended to limit the invention in any way:

EXAMPLE 1

Consumable items:

Film 1-125 micron thickness, HPMC plasticised with lactic acid 15%, and triacetin 5%, processing aids starch 1% and sorbitol monostearate 0.25%.

Film 2 as film 1 but 80 micron thickness.

Glue applied to overlap area of first film—benzyl alcohol 45%, triacetin 50%, HPMC E15 Premium (Dow Chemical Corp.) 5%.

Process Description

Film 1 is thermoformed into single or multiple tablet/caplet shaped pockets in a platen, each pocket containing a lower piston that can be raised or lowered as necessary to suit standard sized tablets and caplets. The tablet shaped pocket also has a raised edge profile around the top perimeter of the pocket. This edge profile is raised 1 mm above the platen surface and has a land width of 0.35 mm. The vertical sidewall of these pockets is typically 3 mm deep.

The thermoforming operation involves the film acting as a membrane dividing the two halves of a vacuum chamber, which are separately controlled. The chamber above the film contains a flat heated platen at a temperature of approximately 150° C. Vacuum is drawn above the film causing it to be held against the heated plate far a period of 1 to 5 seconds preferably 3 seconds. The vacuum in the upper chamber is maintained whilst vacuum is also applied to the lower chamber. At this stage the film remains against the heated platen. Once the vacuum level in the lower chamber reaches at least −0.65 bar (−65 kPa) the vacuum in the upper chamber is released to atmosphere or replaced by positive pressures, this forces the film downwards away from the heated platen and onto the tablet pocket shaped tooling below. In this way the film adepts the shape of the tablet pockets in the lower tooling.

Powder Dosing and Film 1 Cutting

A dosing assembly is then placed over the film formed pocket. This consists of a location mask which sits on location dowels in the platen, and a dosing sleeve that rests directly above the film formed pocket, and sits on the raised edge profile. The dosing sleeve exactly matches the dimensions of the film formed pocket. A dose of powder is deposited into the dosing sleeve and falls into the film pocket. Compaction is achieved via a compaction piston that advances through the dosing sleeve and sweeps any residual powder down into the film pocket below and compacts it to a fixed stop, such that it does not cut the film, but instead comes to rest directly adjacent to the film. The level of compaction is controlled by the mass of powder being deposited into the dosing sleeve. The piston below the compacted powder tablet is then lowered and either the compaction piston is advanced by a similar amount causing a punch cut through the film as it interferes with the inside of the raised edge profile. Alternatively the compaction piston is replaced by a cut piston which similarly advances and causes a punch cut with the raised edge profile. The fit tolerance between the cut piston and the internal dimensions of the raised edge pro profile are such that the diametric clearance no more than 35 microns.

The apparatus is generally of stainless steel, with the piston crowns made of hardened steel. The equipment was machined and supplied by Midland Tool and Design, Birmingham, UK.

The tablet is thus pushed down by the cut piston into the confines of the pocket, and comes to rest on the lower piston. The location mask and dosing sleeve and the waste film web are then removed.

Second Film Application, Cut and Iron

The partly enrobed core is then raised upwards within the tooling, such that half of the formed tablet sidewall is above the raised edge profile. The second film has 15 gsm of glue applied to its surface via gravure roller and this is advanced over the tablets. The film is then thermoformed in the same manner described for the first film, except that the film is held above the tablets by a spacer plate, such that the positioning of the film does not damage the top surface of the tablet. It is possible to use a lower heated temperature (50-150° C.) for the second thermoform, as the film is thinner and softened by the application of the glue. This helps to limit the heat exposure of the powder surface. The location mask is then positioned over the tablet and the second cut piston is lowered. The second cut piston is designed such that it forms a punch cut on the outside edge of the raised edge profile of the lower tooling, with a diametric fit tolerance of no more than 25 microns. The location mask, and second cut piston and waste film web are then removed and the fully enrobed powder core is pushed through a tight fitting tablet shaped heated cylinder (40° C.) to ensure the overlap seal is formed.

EXAMPLE 2

Same conditions as Example 1, but the following step replaces "Powder dosing and film 1 cutting" stage:

Powder Dosing and Film 1 Cutting

A dosing assembly is then placed over the film formed pocket. This consists of a location mask which sits on location dowels in the platen, and a dosing sleeve that rests directly above the film formed pocket, and sits on the raised edge profile. The dosing sleeve exactly matches the dimensions of the film formed pocket. A dose of powder is deposited into the dosing sleeve and falls into the film pocket. The cut is achieved via the cut piston that a through the dosing sleeve and sweeps any residual powder down into the film pocket below. The level of compaction is controlled by the mass of powder being deposited into the dosing sleeve. The cutting piston cuts through the film as it interferes with the inside of the raised edge profile. The cut piston continues to engage with the raised edge for a further 1 mm, and in so doing compacts the powder further into the film shell. The fit tolerance between the cut piston and the internal dimensions of the raised edge profile are such that the diametric clearance is no more than 25 microns.

The apparatus is generally of stainless steel, with the piston crowns made of hardened steel. The equipment was machined and supplied by Midland Tool and Design, Birmingham.

The tablet is thus pushed down by the cut piston into the confines of the pocket, and comes to rest on the lower piston. The location mask and dosing sleeve and the waste film web are then removed.

EXAMPLE 3

Same as example 1, but the tolerance fit for the first cut piston is the same as that for the second cut piston, i.e 25 microns.

EXAMPLE 4

Same as example 2, but the tolerance fit for the first cut piston is the same as that for the second cut piston, i.e 25 microns.

Further description of an apparatus and process used for accurately dosing and compacting powder is provided. The apparatus used in the above process consists of the following assemblies:

A. A platen containing cavities in which the tablets are formed.

B. A thermoforming unit.

C. A powder dosing and compaction unit.

Description of Platen

The platen 22 consists of a stainless steel plate with a surface that contains a row of cavities 48. The cavities have vertical sidewalls and the same cross sectional shape as the tablets that are to be formed, see FIG. 8A-B and 9A-B. There is a raised edge 44 around each cavity 48 with the section shown in FIG. 8B and 9B. This feature for the process of cutting the film that is formed over the tablet in the second part of process. Also note the recessed surface 42 that protects the raised edge and supports the film above the edge prior to first thermoforming operation.

The base of each cavity is formed by the surface 32 of a piston 24. Each piston is a close fit (maximum diametric clearance of 25 micrometres) in its respective cavity and is held securely downwards into the bottom of the cavity by a compression spring 29 fitted around the stem of the piston. The spring force presses the end of the stem onto the surface of a cam which is used to control the vertical position of the piston and hence the depth of the cavities. Details of the piston shape are shown in FIG. 7A-F. Note the concave recess in the front face 32 of the piston 24 and the square edge 34 around the recessed face shown in FIG. 7F.

Figure 7C:
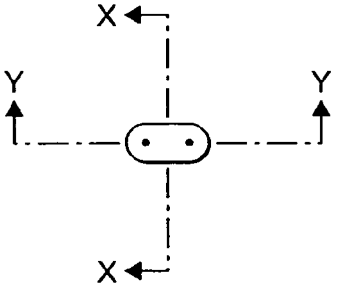
FIG. 7A-F show a lower piston in accordance with an embodiment of the invention, where FIGS. 7A and B show perspective views of the lower piston.
Figure 7E:
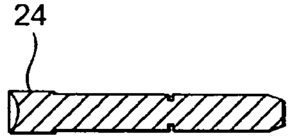
Figure 7D:
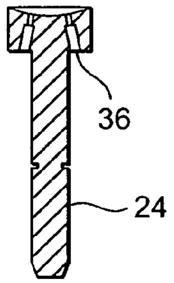
Figure 7A:
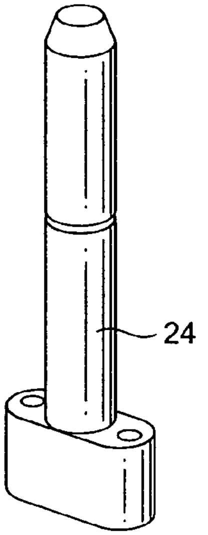
Figure 7B:
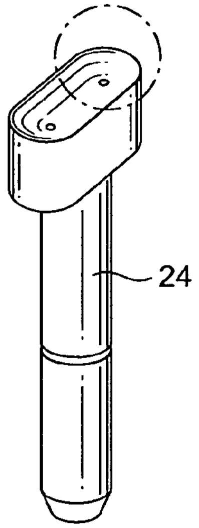
Figure 7F:
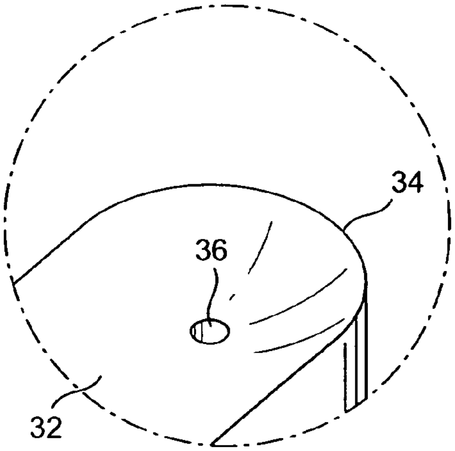
Figure 8A:
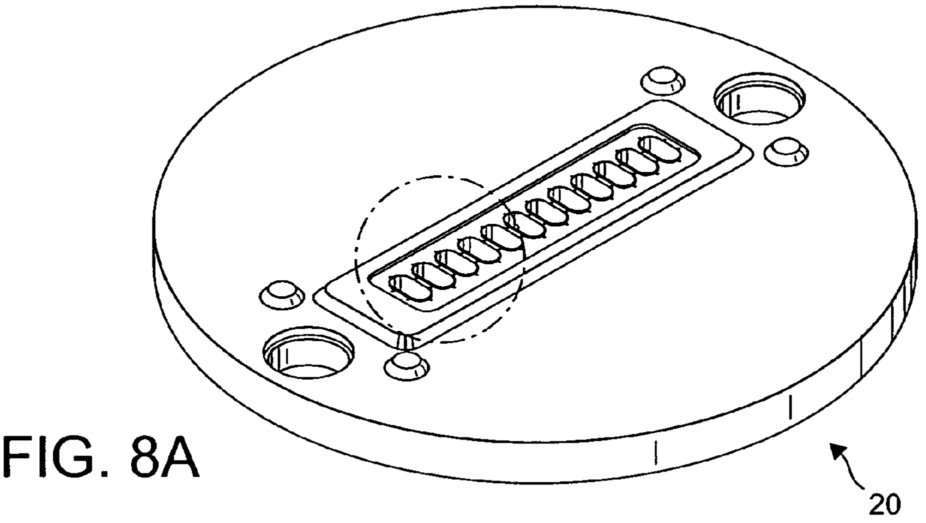
FIG. 8A-B FIG. 8A shows a perspective view of a lower platen in accordance with an embodiment of the invention.
Figure 8B:
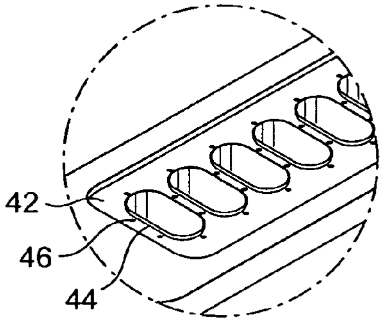
Figure 9A:
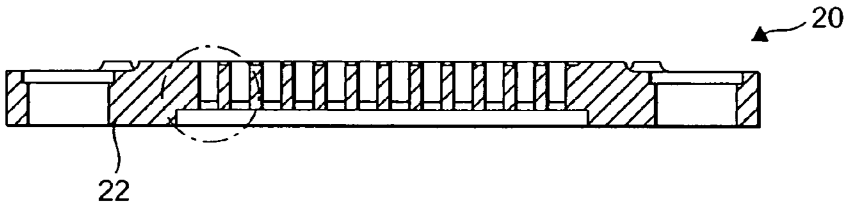
FIG. 9A-B FIG. 9A shows a cross sectional view of the lower platen of FIG. 8A in accordance with an embodiment of the invention.
Figure 9B:
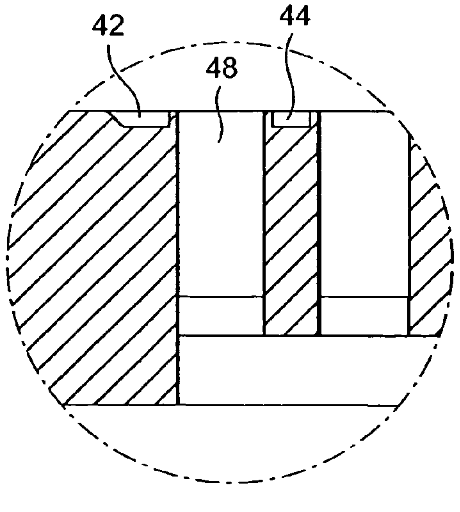

Both the pistons and the platen have small holes 36, 46 (approximately 0.5 mm diameter) in them to allow a vacuum to be created in and around the tablet cavities during the two thermoforming processes that form part of the process. The vacuum holes 46 in the platen are shown in FIG. 8B and the vacuum holes 36 in the piston are shown in FIG. 7A,B,C,D and F.

Views of the complete platen and piston assembly 20 are shown in FIG. 5A-B and FIG. 6A-B.

Description of Thermoforming Unit

Figure 17A:
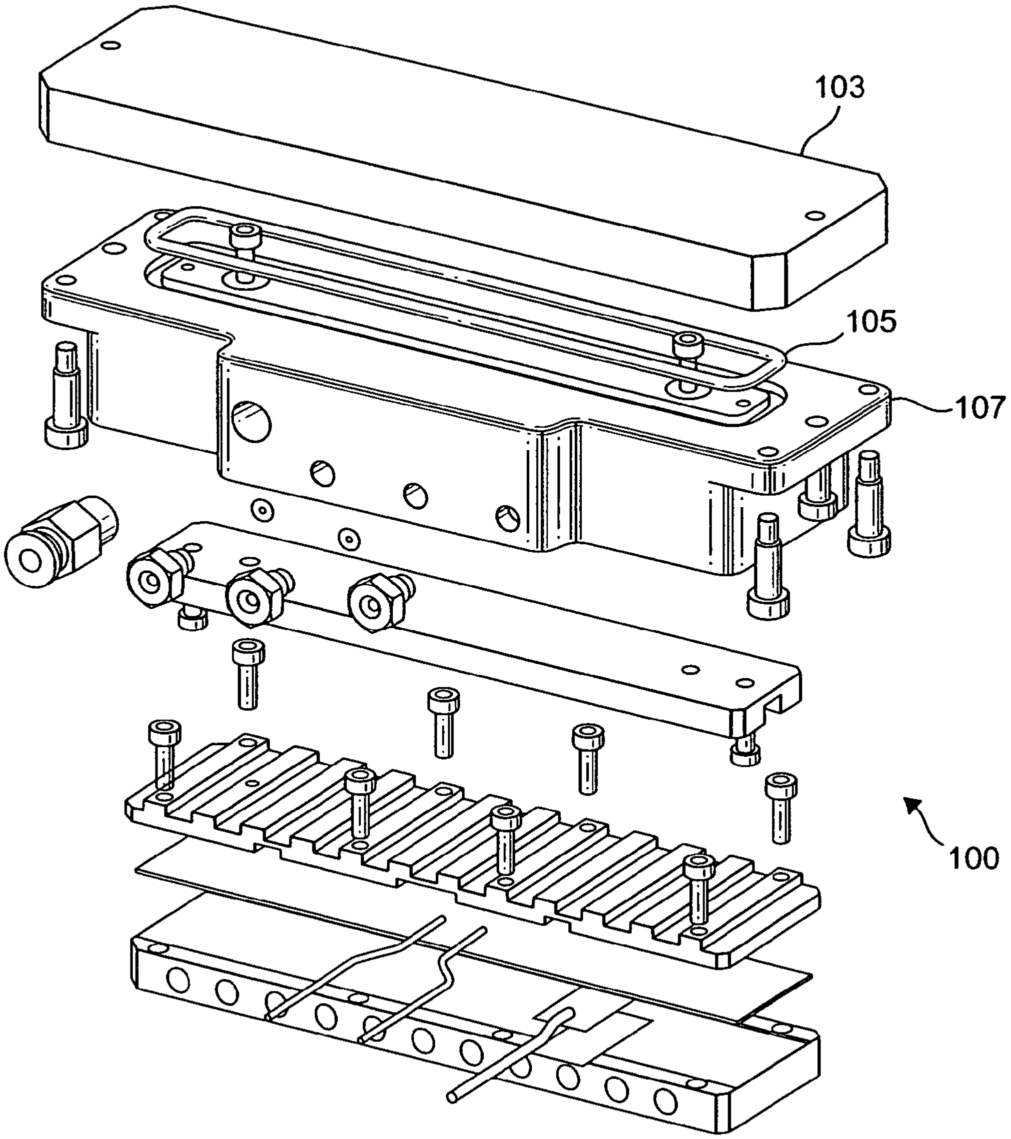
FIG. 17A-B FIG. 17A shows a perspective view of a thermoformer in accordance with an embodiment of the invention.
Figure 17B:
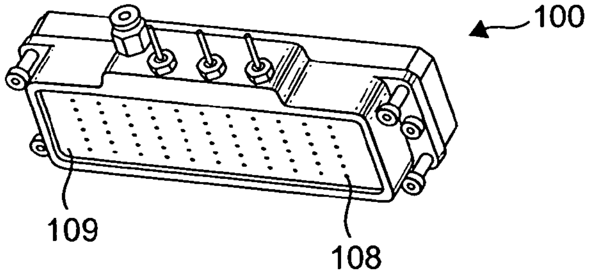

The thermoforming unit 100 consists of a flat heated plate 109 mounted in a chamber that leaves only the surface of the heated plate exposed. The thermoforming unit also has a heater cover 103, heater 105, top block and heated plate 109. The chamber is connected to a vacuum source and the vacuum is connected to the surface of the heated plate by an array of small holes 108 (approximately 0.5 mm diameter). These holes are a feature for the two thermoforming processes that form part of the process. They prevent air bubbles being trapped between the film and the plate. Details of the thermoforming unit, including a view of the holes in the heated plate, are shown in FIG. 17A-B.

Description of Powder Dosing and Compaction Unit

The powder dosing and compaction unit is a complex assembly of parts that is mounted above the platen 22 and is connected to the bulk powder supply. It has three functions:

a. To accurately control the quantity of powder that is placed into each cavity.

b. To compress the powder into the cavities.

c. To cut the film that has been formed into the cavities and thus separates it from the 'waste' film.

Figure 10:
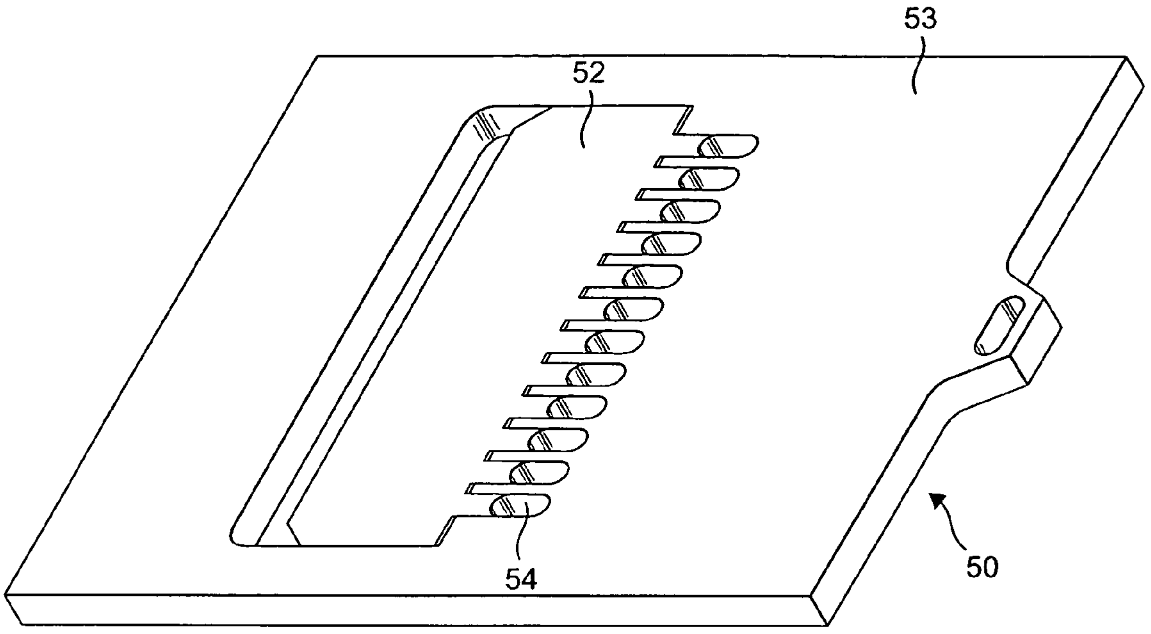
FIG. 10 shows a perspective view of the dosing unit in accordance with an embodiment of the invention.
Figure 11:
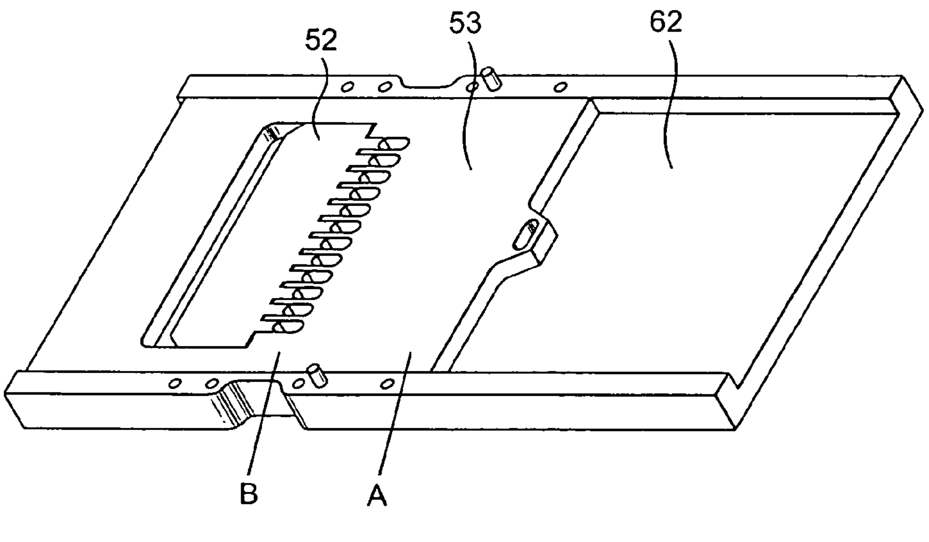
FIG. 11 shows a perspective view of the dosing unit of FIG. 10 slideably engaged with base plate in accordance with an embodiment of the invention.

The quantity of powder is controlled by a slider mechanism 50. The slider consists of two finger shaped plates 52, 53 that fit together as shown in FIG. 10 to create cavities 54 of the same width as the tablets but of adjustable length, the depth of engagement of the two plates controls the length of the cavities. The assembly of these two plates is mounted such that it can slide horizontally in a base plate 62 between position 'A' where the cavities are filled with powder and position 'B' where the powder is compressed into the tablet form, see FIG. 11. The depth of engagement of the two plates thus controls the volume of powder that is transferred in this way.

Figure 12:
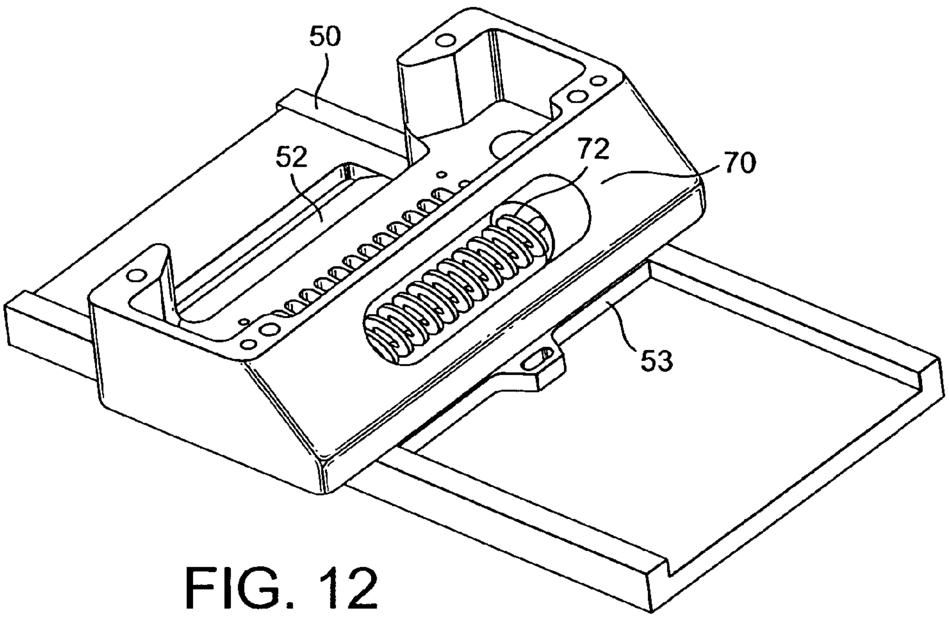
FIG. 12 shows a front perspective view of a dosator engaged with the dosing unit of FIG. 11 in accordance with an embodiment of the invention.
Figure 13A:
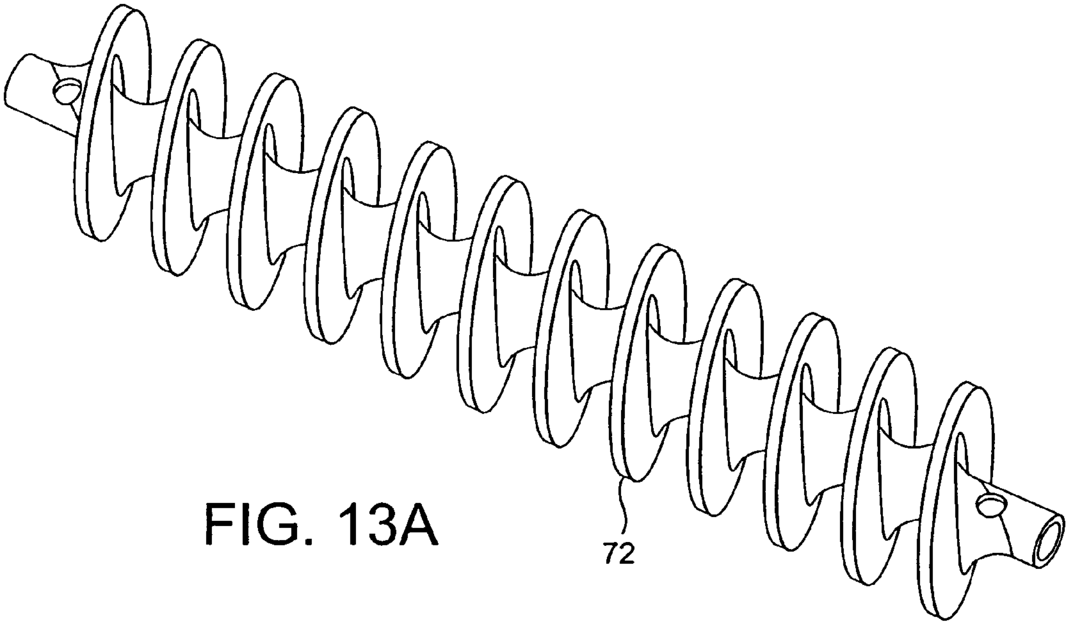
FIG. 13A-B FIG. 13A shows a perspective view of a shaft with vanes of dosator of FIG. 12 in accordance with an embodiment of the invention.
Figure 13B:
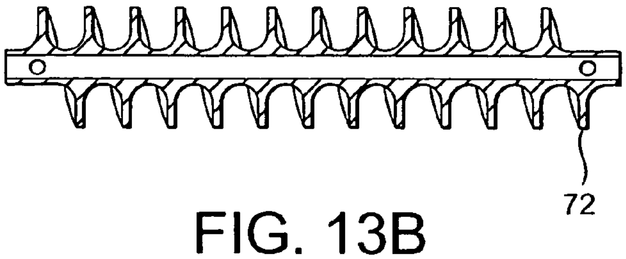

To ensure that the cavities in the finger plates completely fill with powder there is an agitator 72 mounted above the fill area within the upper housing. This consists of a shaft with vanes, of the form shown in FIG. 13A-B. It is important to note that this is not a spiral screw. When the shaft is rotated the vanes agitate the powder gently without compressing it and thus promote a consistent uniform flow of powder. FIG. 12 shows the agitator mounted in the 'dosing piston holder', 70 on the drawing.

Figure 14A:
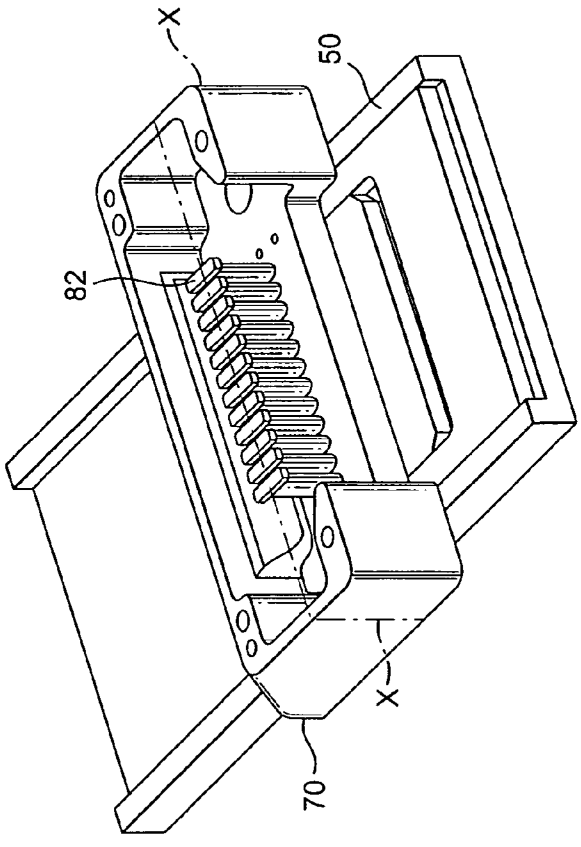
FIG. 14A-B shows a rear perspective view of the dosator dosing, and compaction units of FIG. 12 with compaction pistons in accordance with an embodiment of the invention.
Figure 14B:
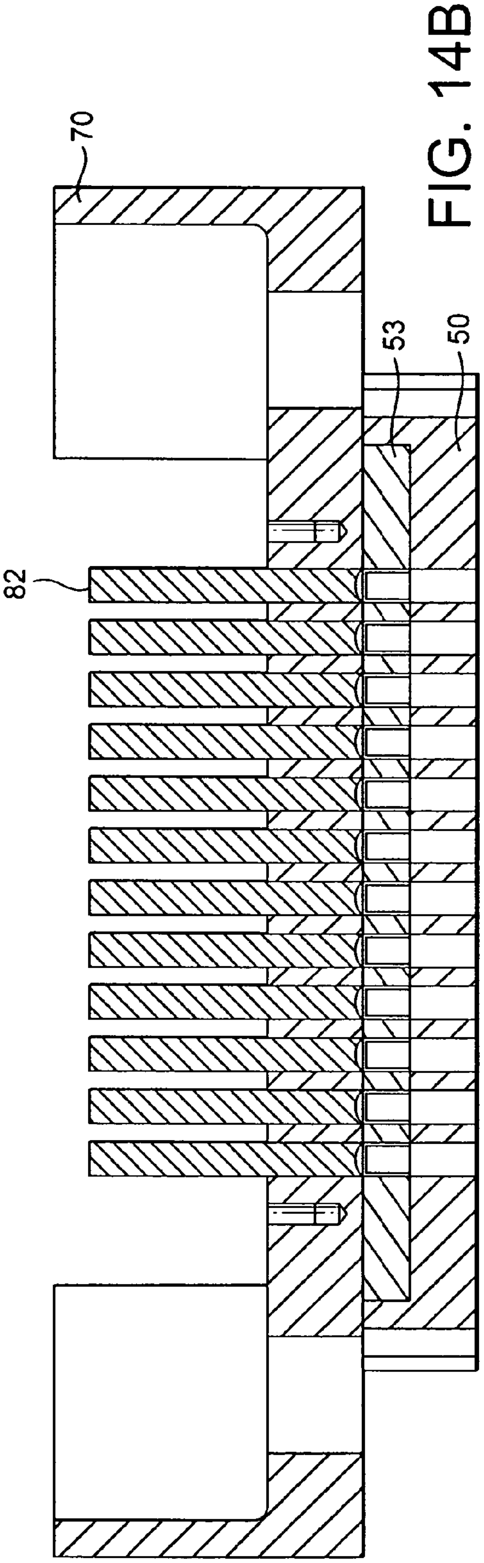
Figure 15A:
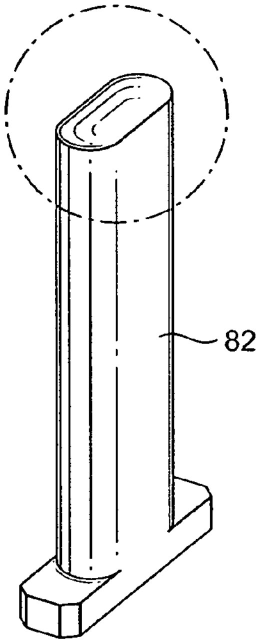
FIG. 15A-C FIG. 15A-B show perspective views of a compaction piston in accordance with an embodiment of the invention.
Figure 15B:
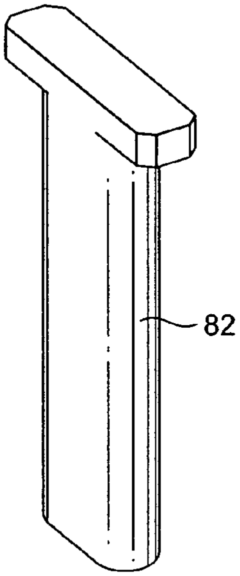
Figure 15C:
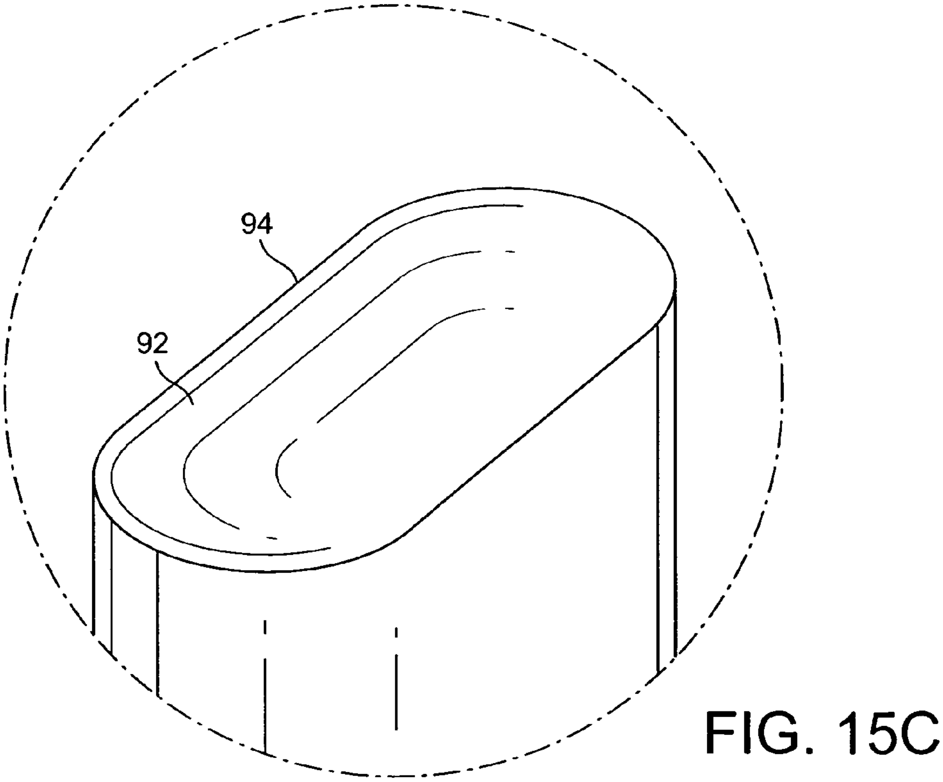
Figure 16A:
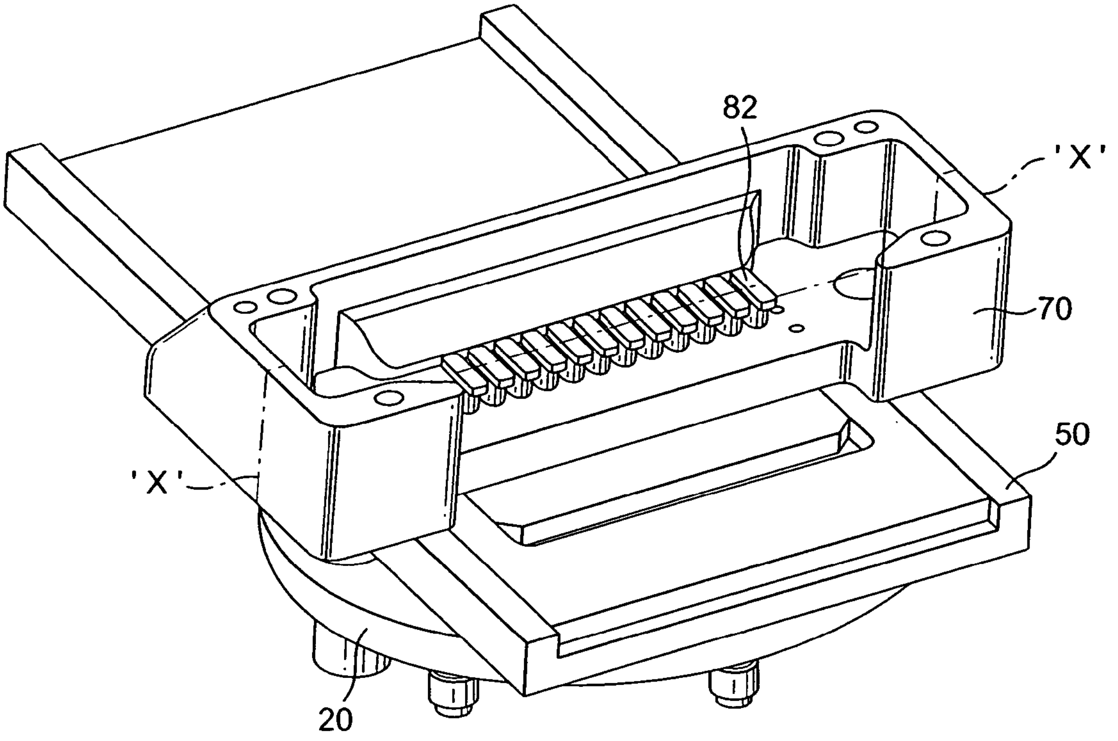
FIG. 16A-B FIG. 16A shows a perspective view of the dosator, dosing and compaction units of FIG. 14A with pistons compressed in accordance with an embodiment of the invention.
Figure 16B:
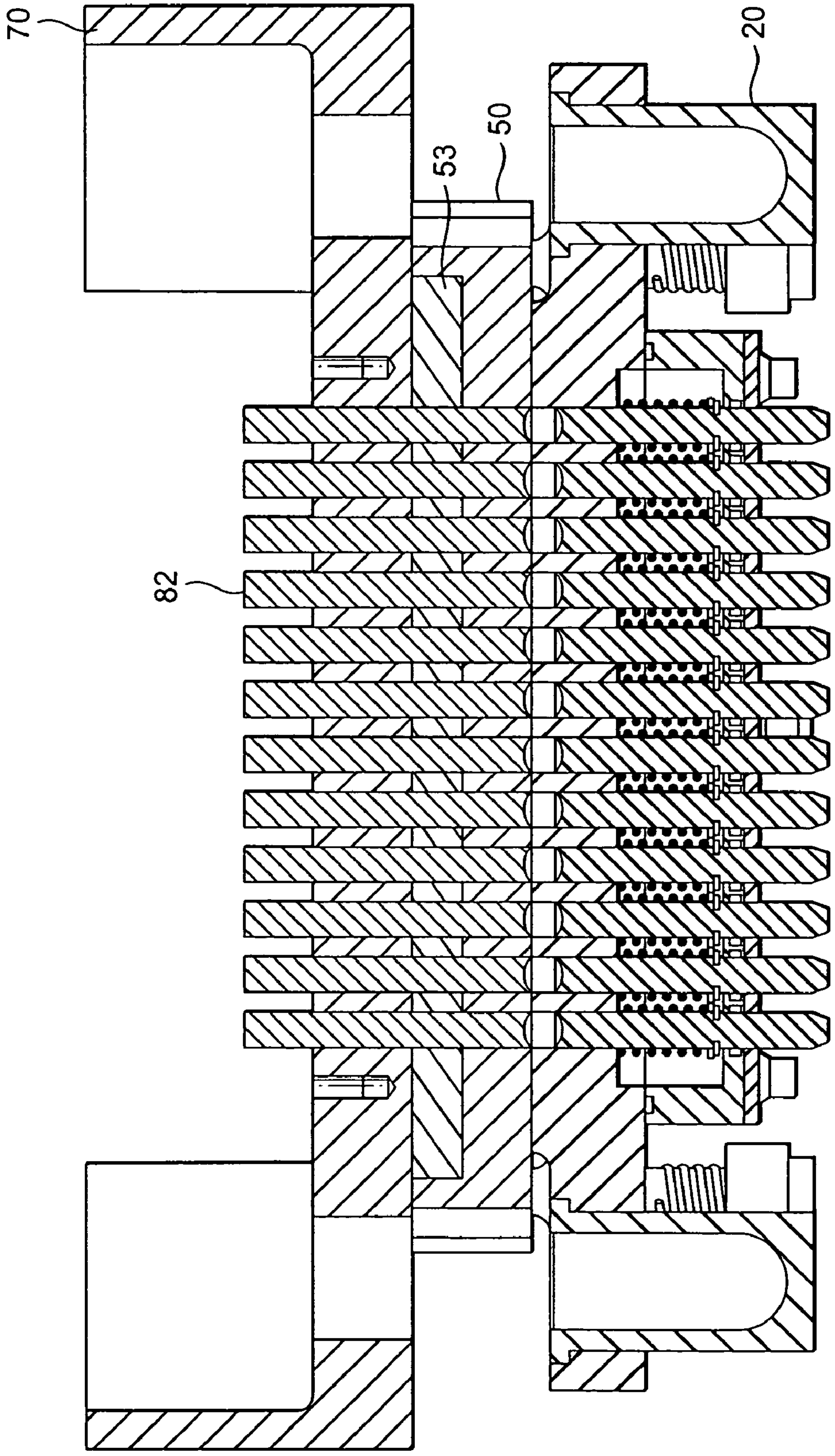

Compression of the powder is achieved by means of a row of pistons 82 that are mounted in the 'dosing piston holder' 70 above position 'B'. FIG. 15A-C illustrate the compression pistons; note the concave recess 92 in the front face of the piston and the square edge 94 around the circumference of the face as shown in FIG. 15C. The pistons pass through bores formed by the finger plates 52, 53 and the base plate 62 as shown in FIG. 14A-B. Thus powder can be swept through the bores and pressed into the platen cavities 48 when the dosing and compaction unit 70 is mounted on top of the platen 22. The assembly of the dosing unit 70, 50 and platen 20 is shown in FIG. 16A and a section through the complete assembly is shown in FIG. 16B.

The strokes of the compression pistons 82 are fixed to ensure a fixed size for the finished tablets. The pistons enter the end of the platen cavities 48 in the last 0.5 mm of the stroke. This results in a shear cut of the film around the inside edges of the cavities.

Description of Thermoforming Process

The process starts with thermoforming the film onto the platen 22.

A sheet of film is placed over the platen 22 and the thermoforming unit 100 positioned over it. The thermoforming unit is then pressed onto the film and platen. This creates a split vacuum chamber with the film acting as a membrane that separates the upper chamber (thermoforming unit) and the lower chamber (platen).

The thermoforming process is started by connecting a vacuum to the upper chamber. This pulls the film onto the heated plate, which is at a controlled temperature of typically 180° C. The values quoted for the temperature of the heated plate, the film heating time and the lower chamber vacuum level are typical but not exclusively definitive. The optimum values for these parameters are dependent on the physical characteristics of the film being used and thus on the film formulation. In general, different operating parameters will be required for different films. After an adjustable period of a few seconds vacuum is also connected to the lower chamber to evacuate the cavities in the platen. Then, when the vacuum level in the lower chamber has reached a set level (typically −0.6 barg (60 kPa) to −0.8 barg (−80 kPa)) and the film heating time has elapsed, the upper chamber is vented to atmosphere. The resulting pressure difference across the film forms it into the cavities in the platen. The thermoforming unit is then lifted off the platen to complete the thermoforming process.

Description of the Powder Dosing Process

After the film has been thermoformed the dosing unit 50, 70 is located onto the platen 22.

The cavities 48 in the finger plates 52, 53 are slid under the rotary agitator 72 and held there for a few seconds. Powder from the bulk supply falls under the action of gravity and the rotary agitator to fill the cavities. The finger plates are then slid to position 'B' so that the cavities (now full of powder) are directly above the cavities in the platen. Finger plate 'B' is then moved relative to finger plate 'A' so that the length of the cavities in the finger plates is equal to the length of the cavities in the platen; this ensures that all the powder in the finger plate cavities can be swept out by the compaction pistons.

Description of the Powder Compaction Process

The compaction pistons are pressed through the finger plates and base plate to press the powder into the platen cavities. Applying more force compacts the powder to form firm tablets within the film shells that have been formed into the platen cavities.

The size of the finished tablets is fixed and independent of the quantity of powder transferred because the stroke length is fixed and the force provided to compact the powder is in excess of that required to achieve the full stroke.

Description of the Film Cutting Process

The last 0.5 mm of movement of the compaction pistons makes them enter the top of the platen cavities. This cuts the film and thus severs the tablets from the sheet of film they have been formed from.

The action of the compaction pistons entering the cavities in the platen is an important feature of the cutting process. It creates tablets with very well defined edges and overall shape as compared to the alternative method of using separate compression and cut processes.

The cutting of the second film (formed over the top of the top of the tablet in the second part of the process) is achieved in a similar way but in this case the cutting tool is a hollow tablet shaped tool that engages with the outside edge of the raised profiles on the platen to achieve a shear cut.

Draft Timing Diagram for Process

Figure 18:
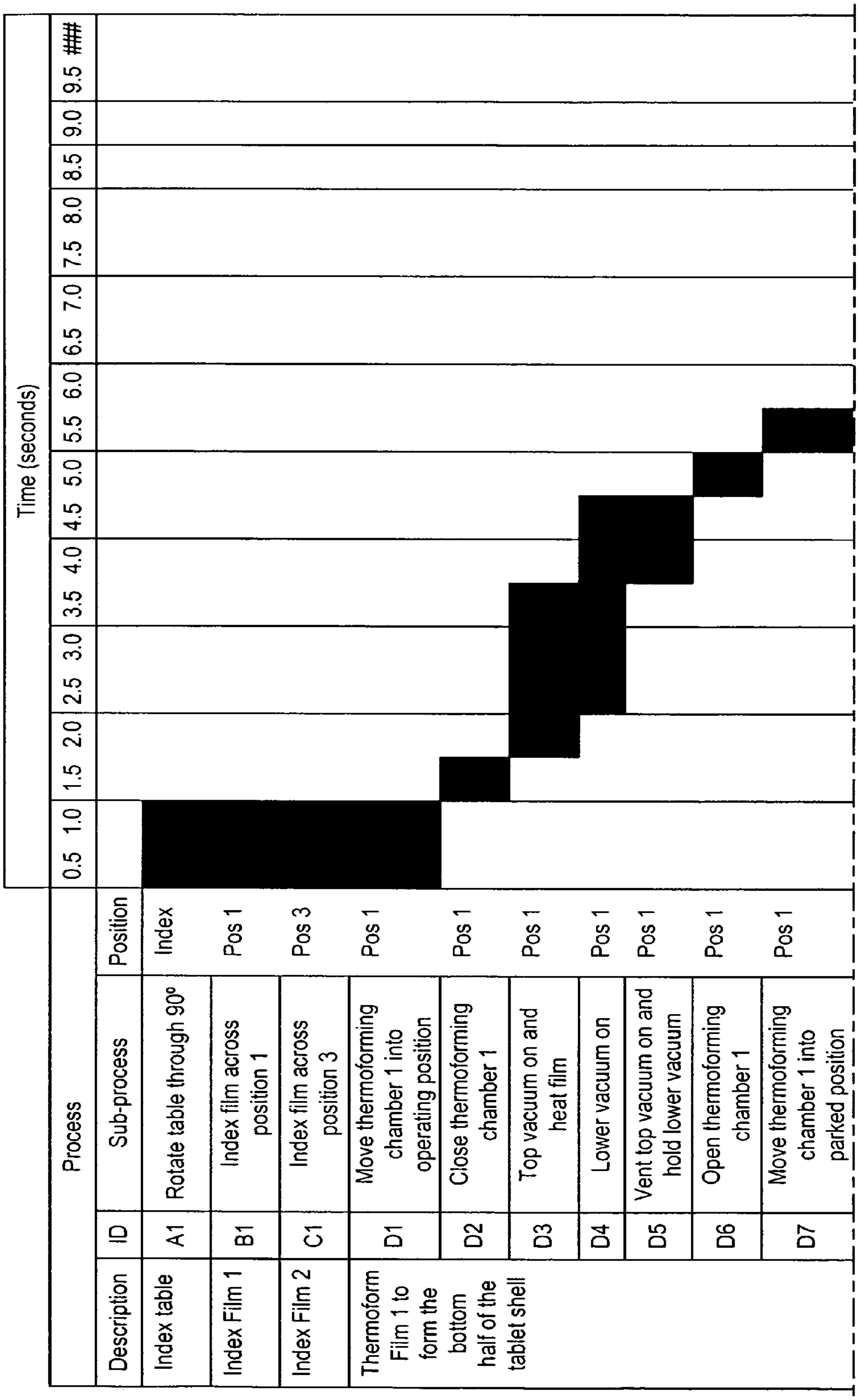
FIG. 18 shows a timing diagram of a system in accordance with an embodiment of the invention.
Figure 18:
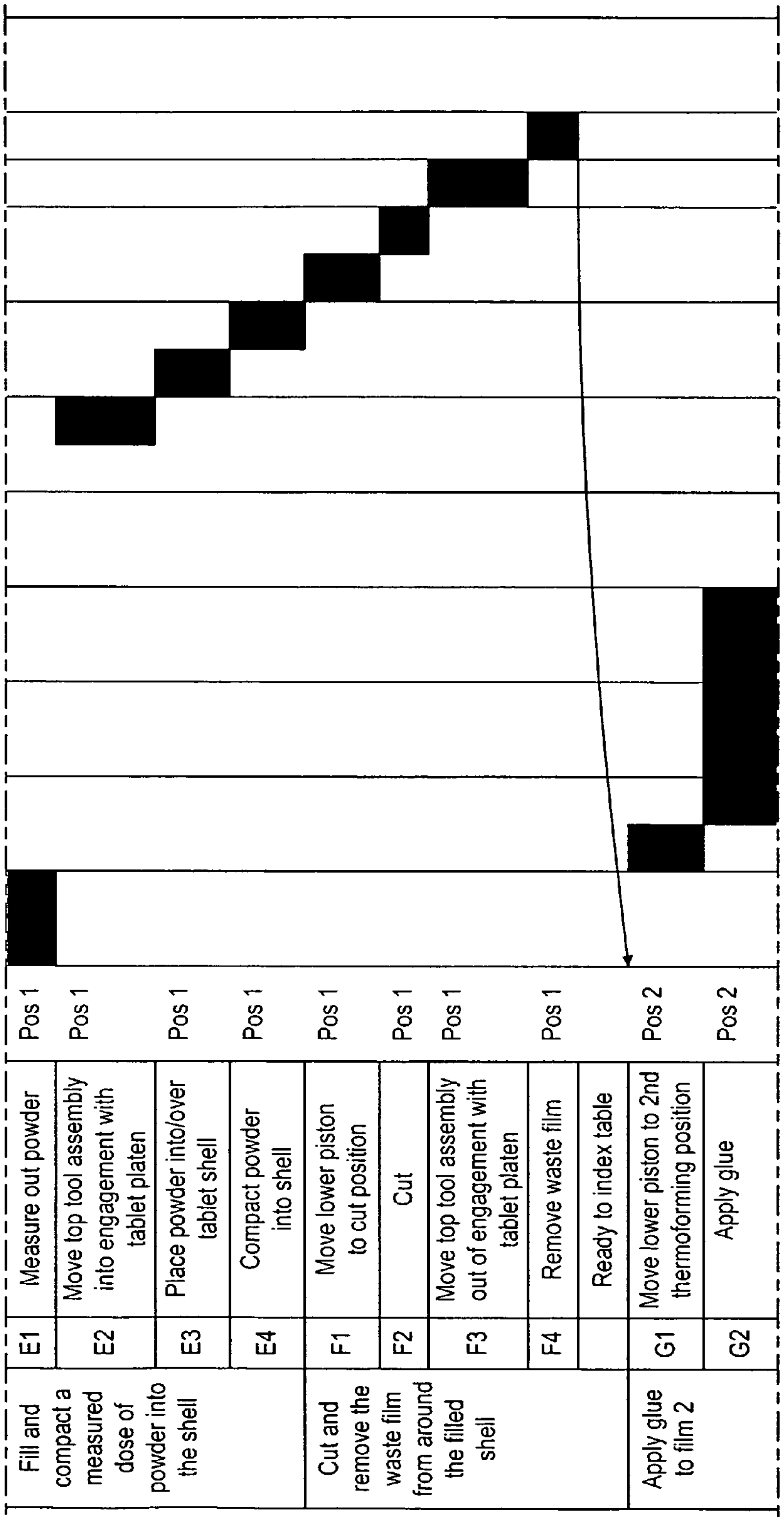
Figure 18:
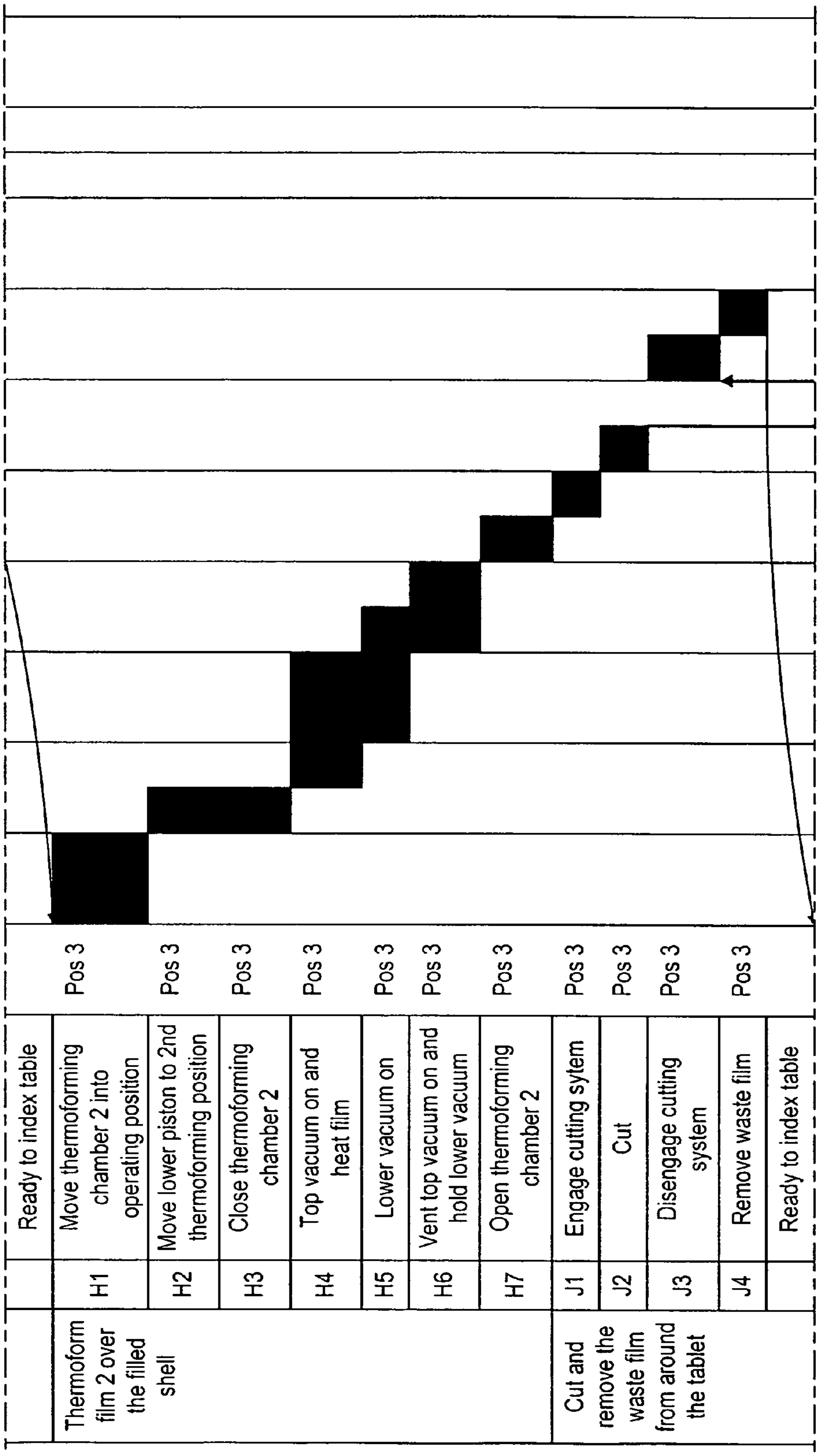
Figure 18:
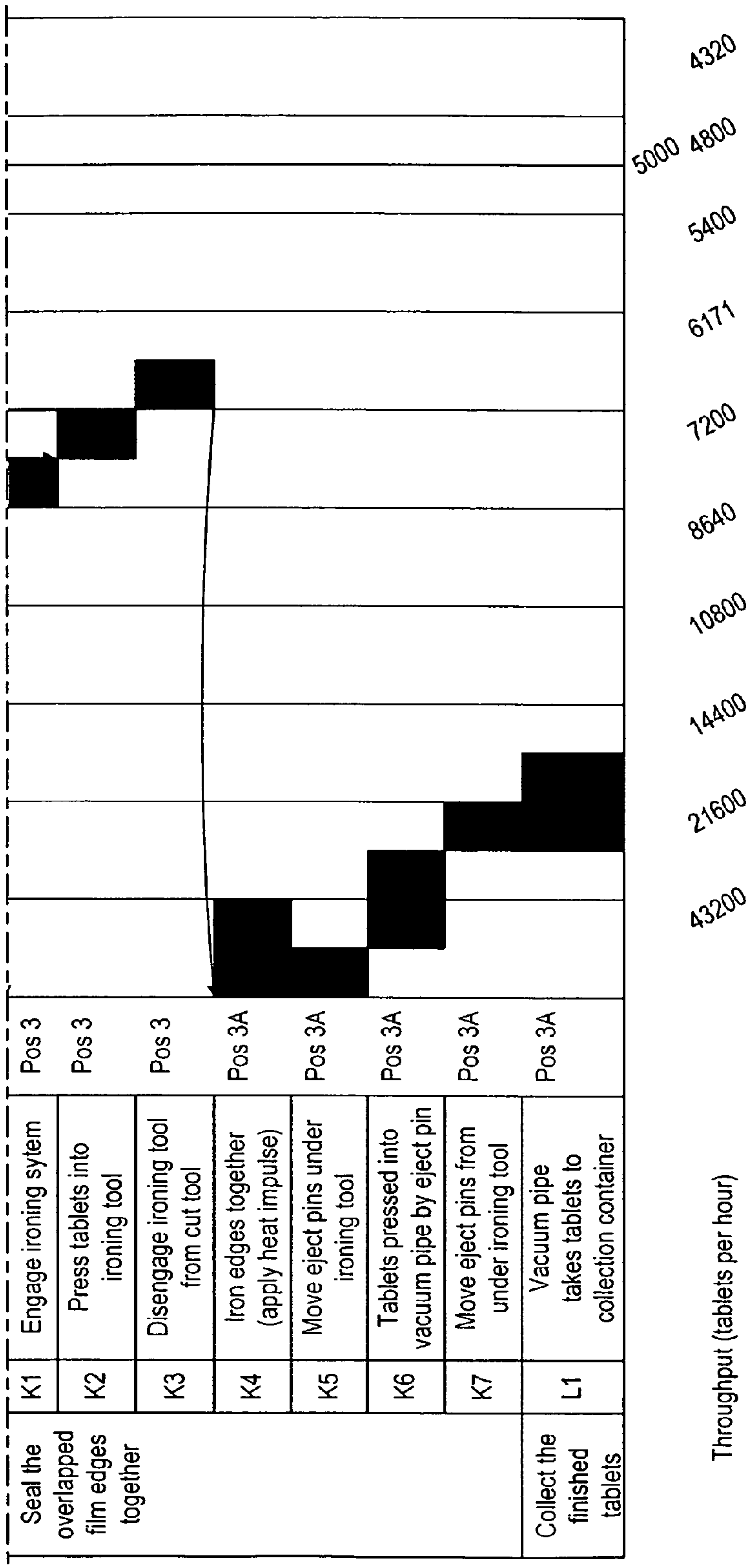

A draft timing diagram 110 for the complete process is shown FIG. 18 to help clarify the sequence of events for the thermoforming, dosing, compaction and cutting processes.

Figure 19A:
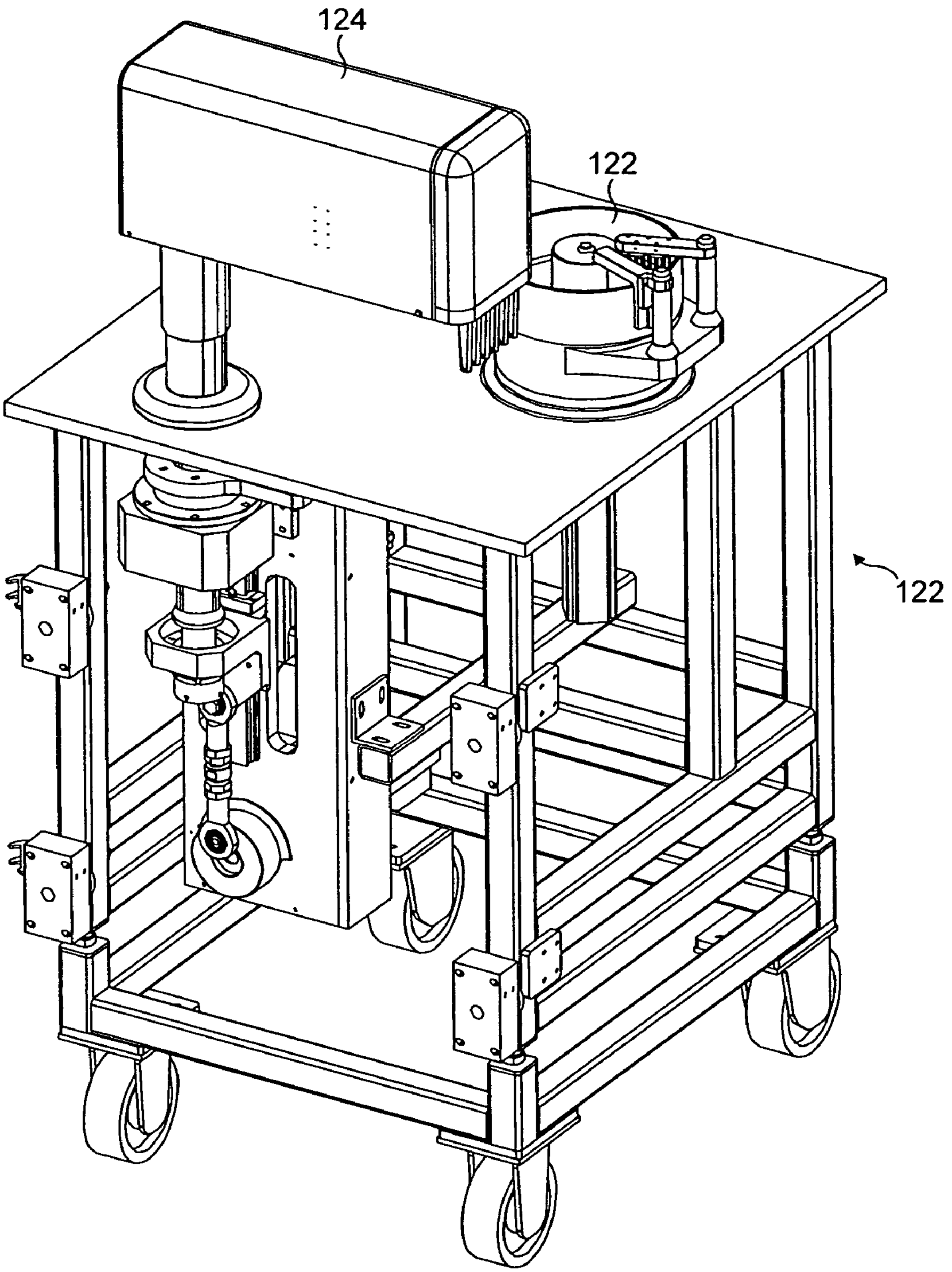
FIG. 19A-C, FIG. 19A shows a perspective view of a dosator in accordance with an embodiment of the invention.
Figure 19B:
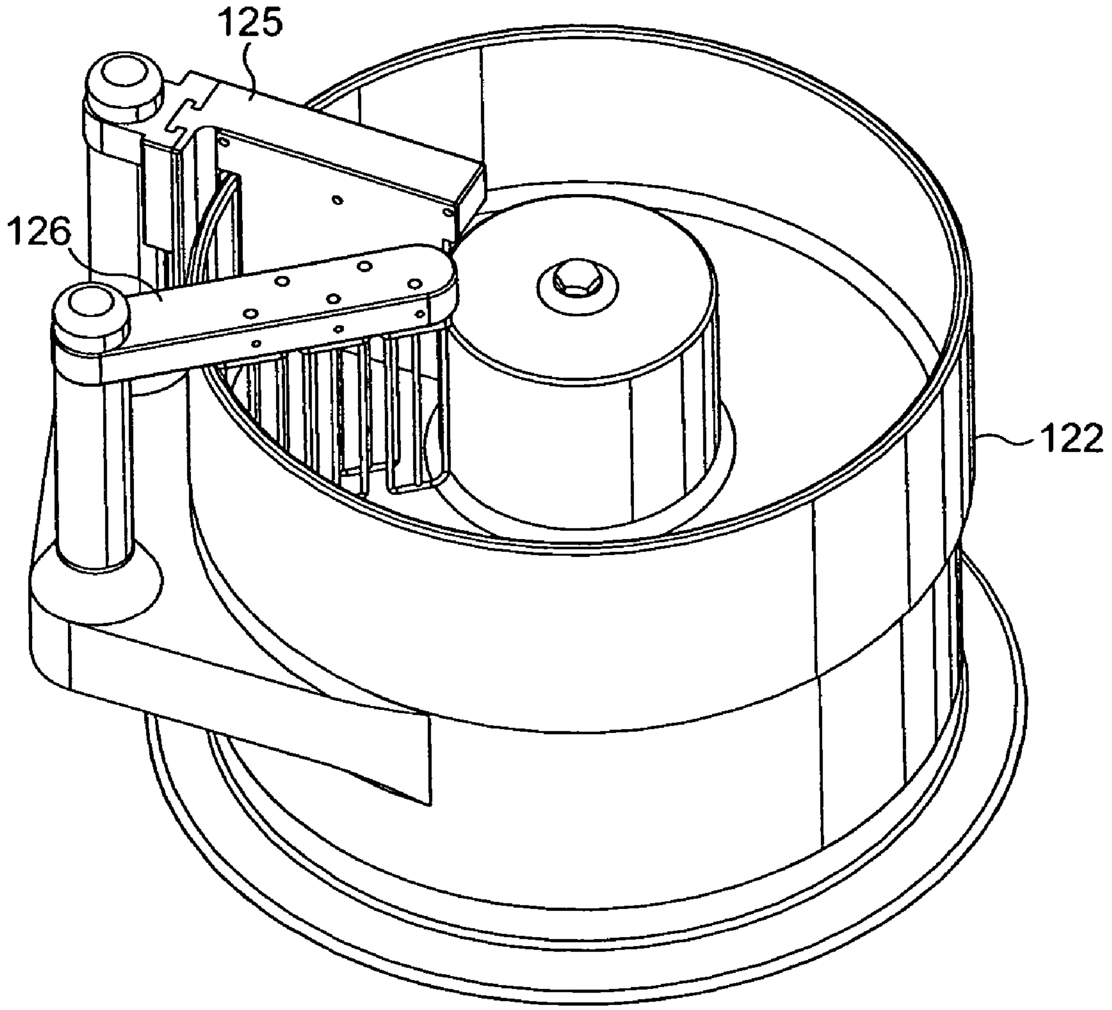
Figure 19C:
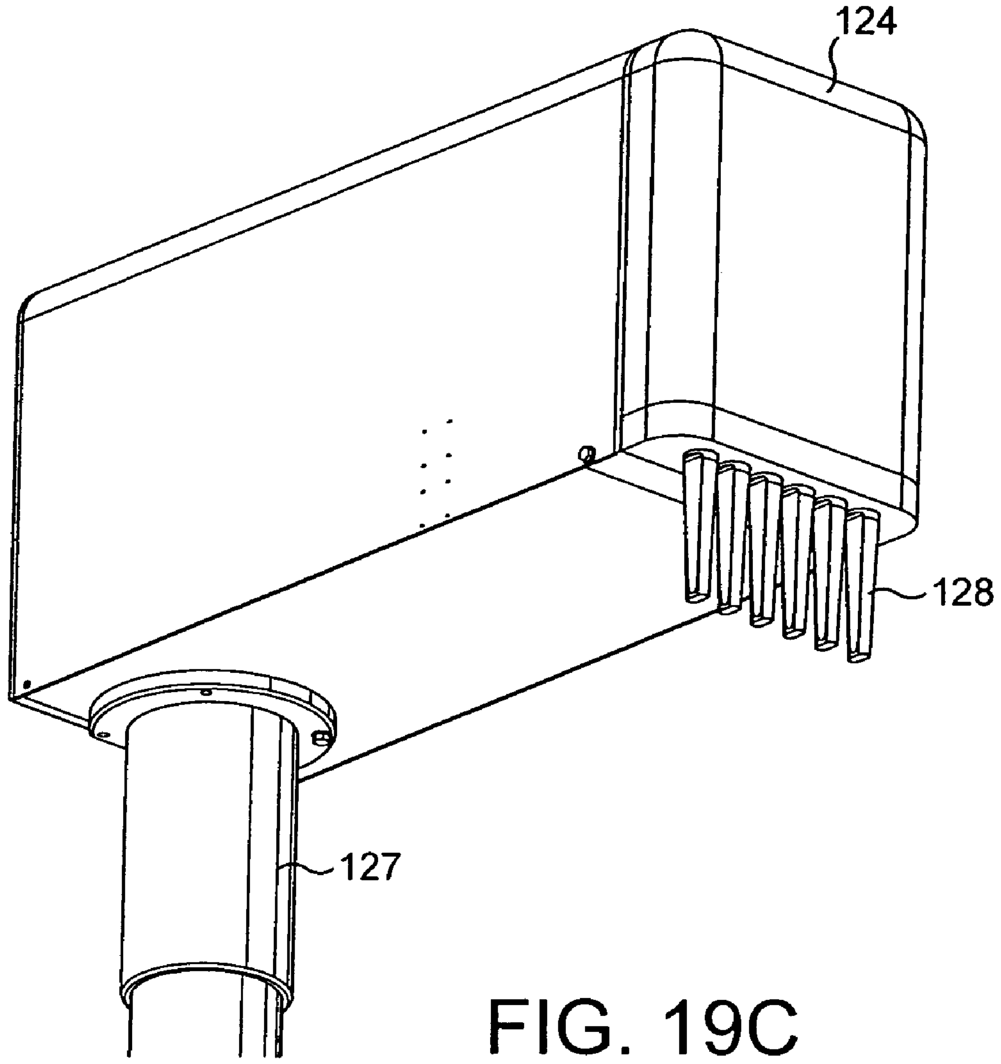

In another embodiment, the powder dosing and compaction unit may be configured in another manner, as shown in FIG. 19A-C and FIG. 20A-C. FIG. 19A shows a dosator 120 with a dosator powder bowl 122 and a dosator dosing head 124. The dosator powder bowl is shown in more detail in FIG. 19B, with an anti-clogging device 126 and a powder levelling device or doctor 125. The dosator powder bowl rotates at a constant clockwise speed, and the powder is hopper feed to the dosator dosing head as shown in more detail in FIG. 19C. The dosator dosing head has dosing tubes 128 and a rotary head 127 to rotate the dosator dosing head. The dosing tubes may be configured with internal tamping pins (not shown) for pre-compacting the powder in the dosing tubes and transferring the powder from the tubes into the pocket. In use the dosator powder bowl rotates at a constant clockwise speed, and the dosator powder bowl is fed with powder through a hopper system. The powder is set to a specific height by the dosator blade, and the dosator head rotates over the dosing bowl. The dosator tubes are charges by lowering the tube to a known depth into the dosator powder bowl. The internal tamping lightly pre compact powder into a slug, in order to avoid spillage and ease of handling later on in the process. The powder is retained in the tubes by the pre-compaction effect but there is a vacuum retention facility available if required. i.e. for very fine fill powders. (Fill volume is varied by altering the depth that the tubes are lowered into the dosator powder bowl). Then the dosator head rises and rotates through approximately 180° to a position over the dosing unit 130 shown in FIG. 20A-C and discussed in greater detail below. The dosator head is lowered to the top of the dosing unit cavities, and the lightly pre-compacted slugs are transferred using the internal tamping pins from the dosator tubes into alternate cavities of the dosing unit. In this embodiment the platen has twelve cavities of an eleven and half millimetre pitch. Since the dosator cannot achieve this pitch, the dosator dosing head has six tubes. As a result of this, the dosing unit is charged in two cycles of the dosator. After discharging the dosing unit the dosator head rises and rotates over the dosing powder bowl ready for the next cycle.

Figure 20A:
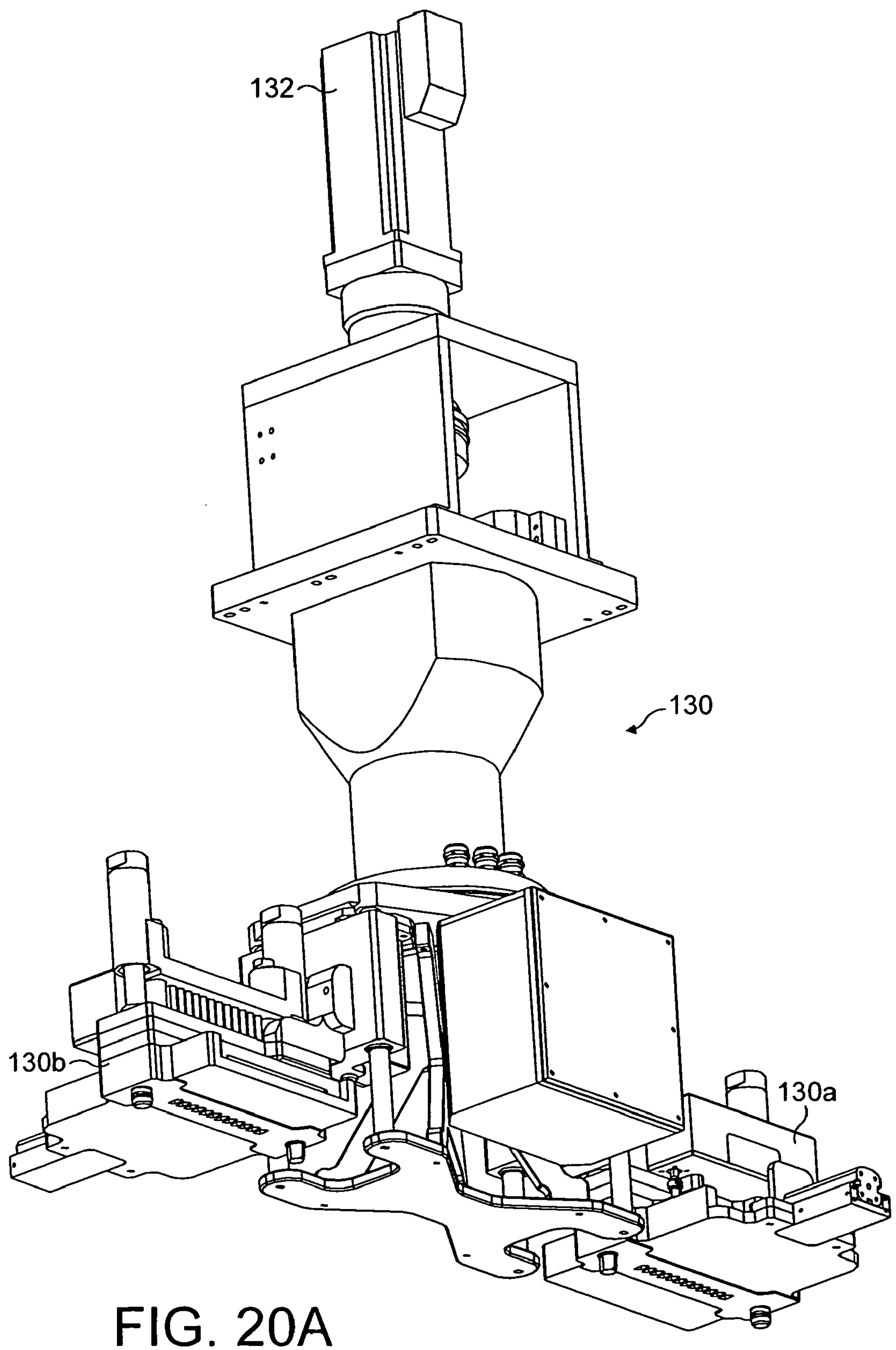
FIG. 20A-C, FIG. 20A shows a perspective view of a dosing unit and rotor head assembly in accordance with an embodiment of the invention.
Figure 20B:
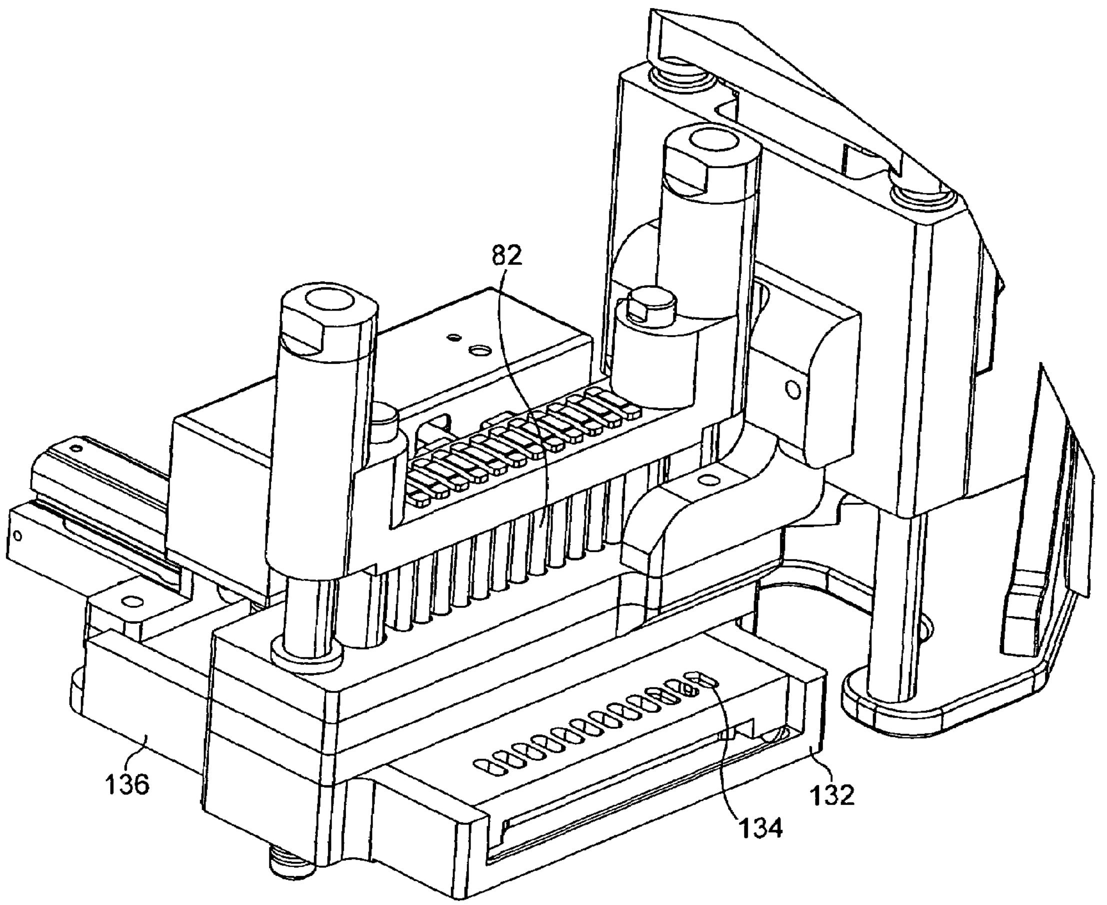
Figure 20C:
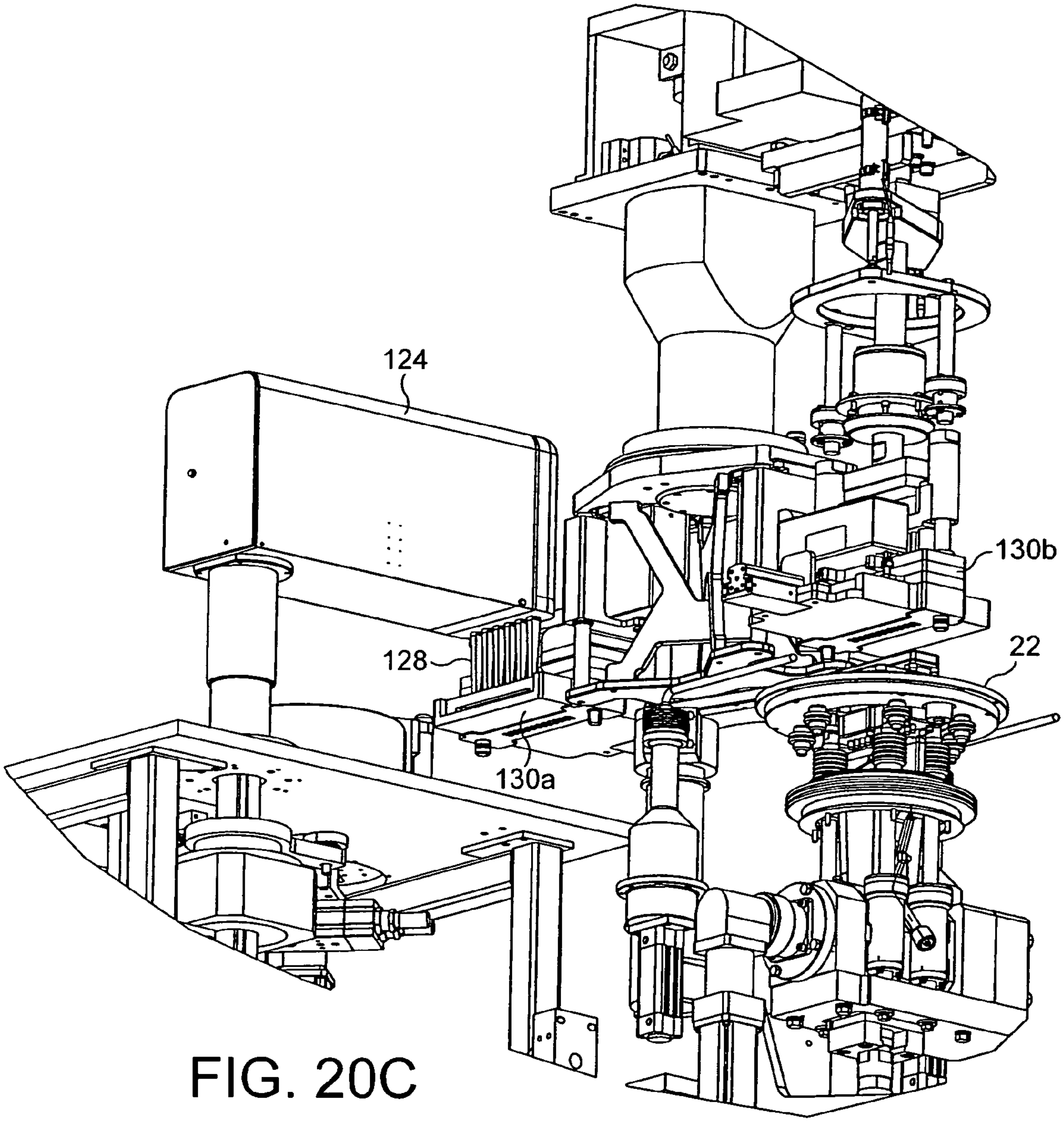

The dosing unit 130 is shown in FIG. 20A-C, and is configured in this embodiment with two dosing units 130*a*,130*b* mounted on a rotor head assembly 131, as shown in FIG. 20A. The rotor head is driven by a servo motor. FIG. 20B shows a dosing unit in more detail. Each dosing unit has a dosing sledge 132 with dosing cavities 134 for holding the powder upon discharge from the dosing tubes of the dosator dosing head. The dosing units also each house the compaction pistons 82. A pneumatic cylinder 136 may slide sledge from a charging position to dosing position and vice versa. The final location in dosing position may be achieved by precision location pins actuated by pneumatic cylinders. FIG. 20C shows the dosator dosing head charging the dosing unit 130*a* in dosing position, and the dosing unit 130*b* preparing to dose the pockets 48 of the platen 22. The dosator powder tubes 128 charge out the powder into the cavities of the sledge. The rotor head 131 rotates the dosing units 130*a*, 130*b*. Dosing unit 130*a* assumes the dosing position and doses the pockets having the vacuum formed film. After compaction pistons are engaged and compress the powder in the pocket and cut the film as discussed above.

While this is happening, the other dosing unit 130*b* is being charged by the dosator ready for the next machine cycle. At any time one dosing unit is in the powder charging position, while the other dosing unit is in the process position.

Figure 21:
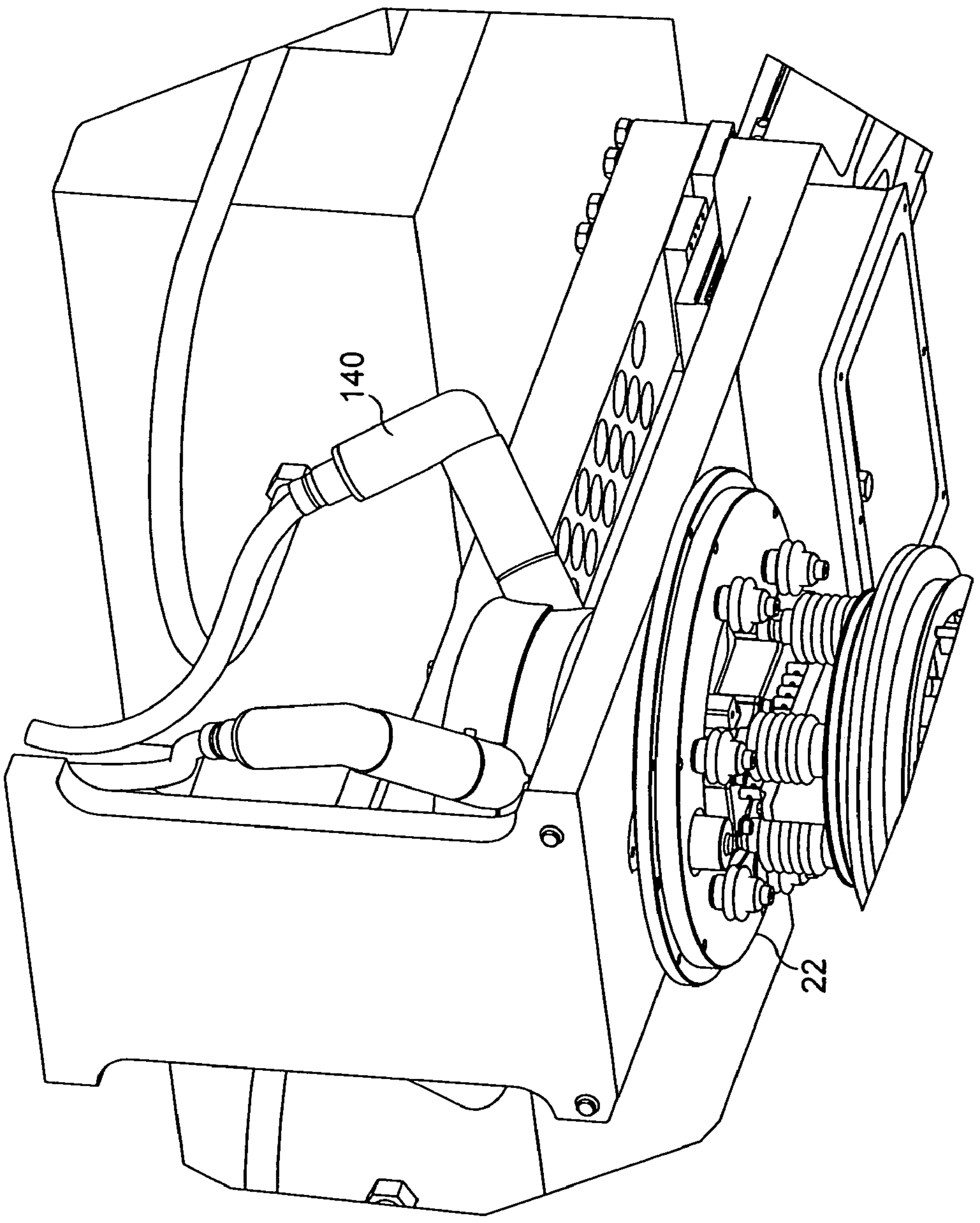
FIG. 21 shows a perspective view of an inkjet assembly in accordance with an embodiment of the invention.

In another embodiment glue is applied prior to the application of the second film onto the partially enrobed slug, i.e. the first film and the powder slug. FIG. 21 shows an inkjet assembly 140 that may be used to spray the glue into a pattern or logo onto the partially enrobed slug. A screen may be used to expose the partially enrobed slug and protect the platen 22.

Figure 22:
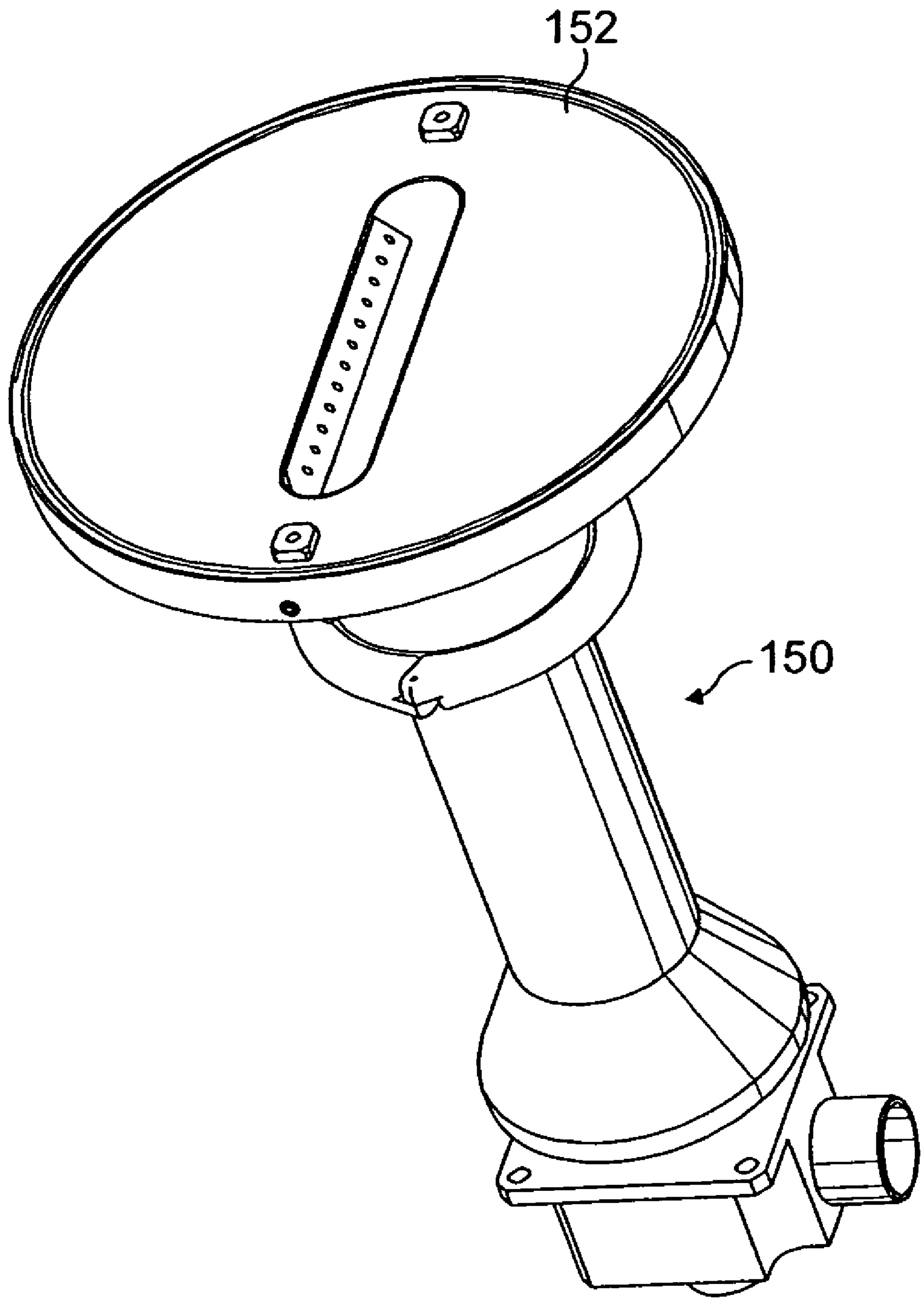
FIG. 22 shows a perspective view of a vacuum for cleaning the platen and the pockets in accordance with an embodiment of the invention.
Figure 23:
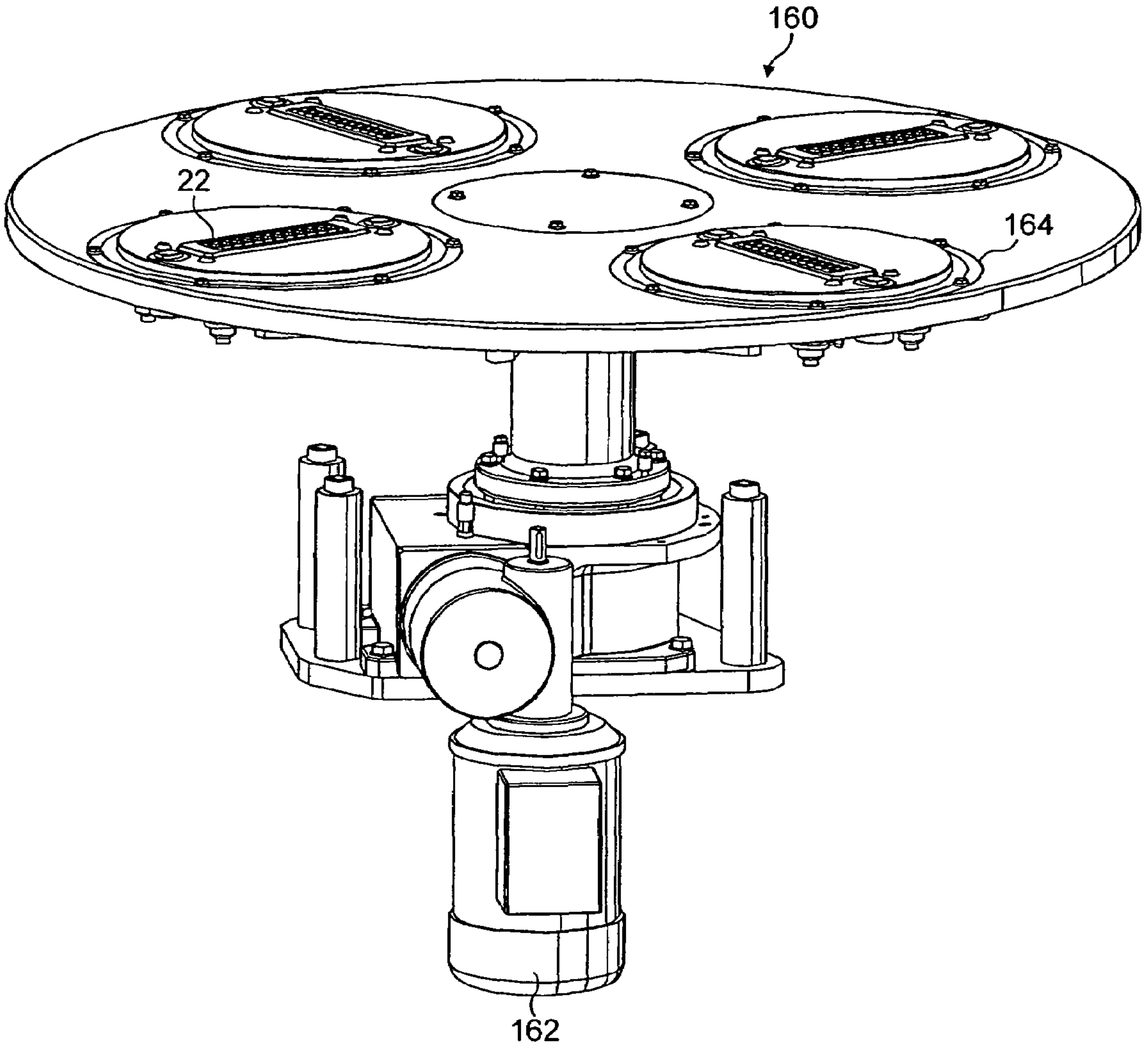
FIG. 23 shows a perspective view of a turntable for holding the platen to transfer the platen from one processing station to another processing station in accordance with an embodiment of the invention.

In another embodiment a vacuum nozzle unit 150 is applied to platen to disturb any waste powder in the cavities of the platen, as shown in FIG. 22. Air is forced through the nozzles into the cavities of the platen when the vacuum nozzle unit is oriented proximate the cavities and the platen hood 152 forms a seal with the platen to enable the cleaning process.

Figure 24:
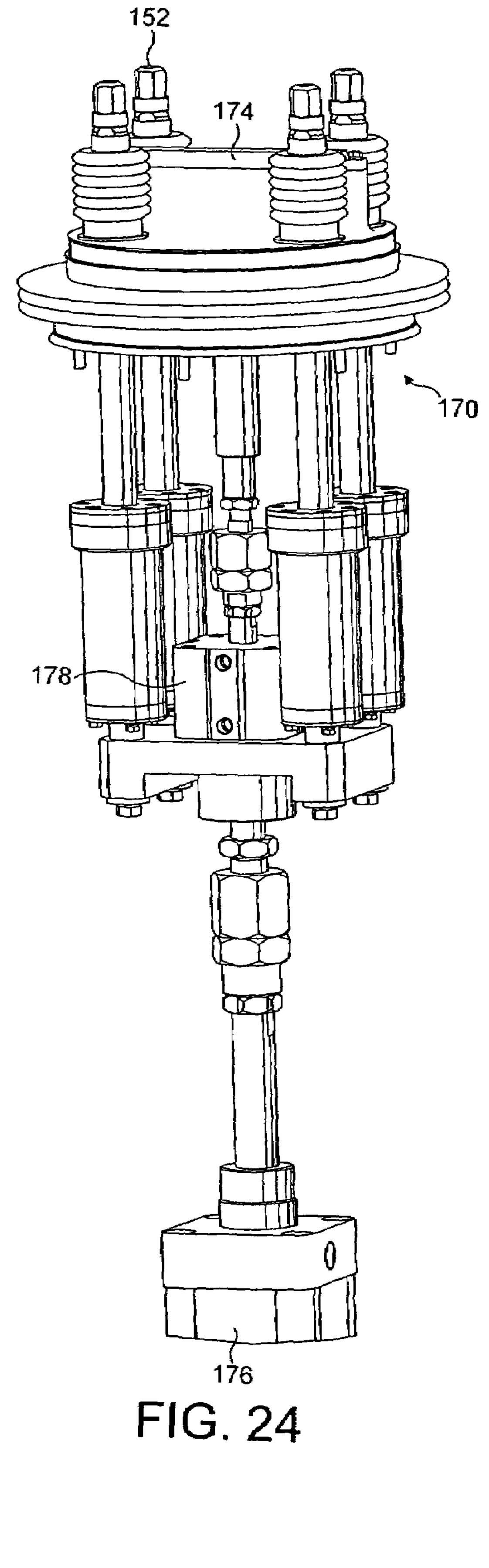
FIG. 24 shows a perspective view of a cam unit for raising and lowering the platen from the turntable in accordance with an embodiment of the invention; and FIG. 25A-E

In another embodiment the apparatus has a turntable assembly 160 for holding the platen and transferring the platen from one station to the next during processing. An indexing drive system 162 can rotate the platen through 90° for each process cycle. The platen may be held in the turntable by a lower platen retaining assembly 164 with a seal retaining ring that may be secured to the turntable. The platen may be raised from the turntable by a cam unit 170 shown in FIG. 24 where rods 172 lift platen out of turntable, follower 174 makes contact with underside of lower pistons in platen to facilitate movement, pneumatic cylinder 178 raises and lowers lower pistons, and pneumatic cylinder 176 raises and lowers platen. The platen is raised from the turntable to ensrue that the turntable is not exposed to the compaction pressure forces during processing. With this configuration, the four platens may be processed simultaneously in four stations. For example the first station may be the dosing, compaction and partial enrobement, the second station may be the inkjet application of glue to the sidewall of the partially enrobed slug dosage form, the third station may be the application of the second film enrobement of opposite side of the partially enrobed slug dosage form and ironing, and the fourth station may be platen vacuum cleaning station using airjets and vacuum to dislodge and suck processing dust to clean the platen.

With this configuration station 1 procedure of dosing, compaction and partial enrobement begins with film indexing, charged dosing unit 130*a* rotates through 180° to the process position and turntable 160 indexes through 90° to process position. The platen 22 is lifted out of turntable by the station 1 cam unit 170 using for example a TOX unit (TOX is a trademark in certain countries of Tox Pressotechnik GmbH & Co. KG of Germany) and lower pistons 24 are set at the appropriate operating height using the eccentric cam and the film lifter assemblies lower. The film indexes and the thermoformer 100 rotates through 90° to process position. The compaction assembly clamps the dosing unit, thermoforming unit film and platen together and film is thermoformed into platen cavities. The compaction assembly releases and the dosing unit lifts using the air spring pneumatic cylinder. The thermoformer returns to the home position, and the compaction assembly clamps the dosing unit to the platen. Precise location is achieved using the tapered pins on the dosing unit and spring loaded tapered bushes on platen assembly. The dosing unit sledge 132 is moved to the dosing position and charges the cavities 134. The compaction pistons compress the powder into the cavity to form the tablet and subsequently cut the film in one action, and the compaction assembly releases. The dosing unit lifts using for example air spring pneumatic cylinder. The film lifters assemblies lift stripping the waste file from the platen, the platen drops back into the turntable accentuating the stripping effect and lower pistons return to home position when the station 1 cam unit is lowered, ready for the turntable to index. Whilst this is happening the other dosing unit 130*b* is being charged by the dosator ready for the next machine cycle which is performed in two passes (6 alternate cavities are dosed and then the remainder) due to the close spacing of the platen cavities.

With this configuration of inkjet 140 application of glue to sidewall of dosage form begins with the turntable 160 indexing through 90° to process position. The platen 22 is lifted out of turntable by the station 2 cam unit by pneumatic cylinder 136 and precise location is achieved using the tapered pins location on the underside of the inkjet main body and spring loaded tapered bushes on platen assembly. The lower pistons 24 are set at the appropriate operating height using the eccentric cam, as a result the tablets are moved up the cavities to the correct level for the glue application. Fast outward stroke of print head assembly 140 to start position of inward process stroke. A constant speed inward stroke to applied glue pattern (logo) to tablets using the print head configuration. The platen drops back into the turntable and lower pistons return to home position when the station 2 cam unit is lowered. Ready for the turntable ±c index.

Figure 25A:
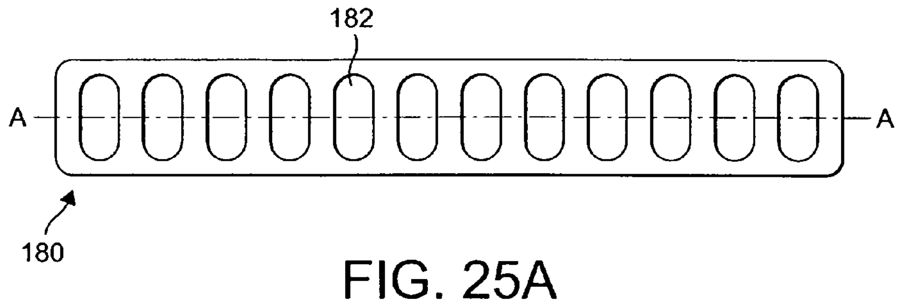
FIG. 25A shows a tablet gasket in accordance with an embodiment of the invention.
Figure 25B:
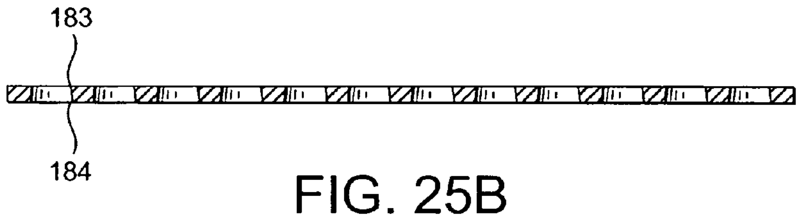
FIG. 25B shows a cross-sectional view taken along A-A of the gasket in FIG. 25A.
Figure 25C:
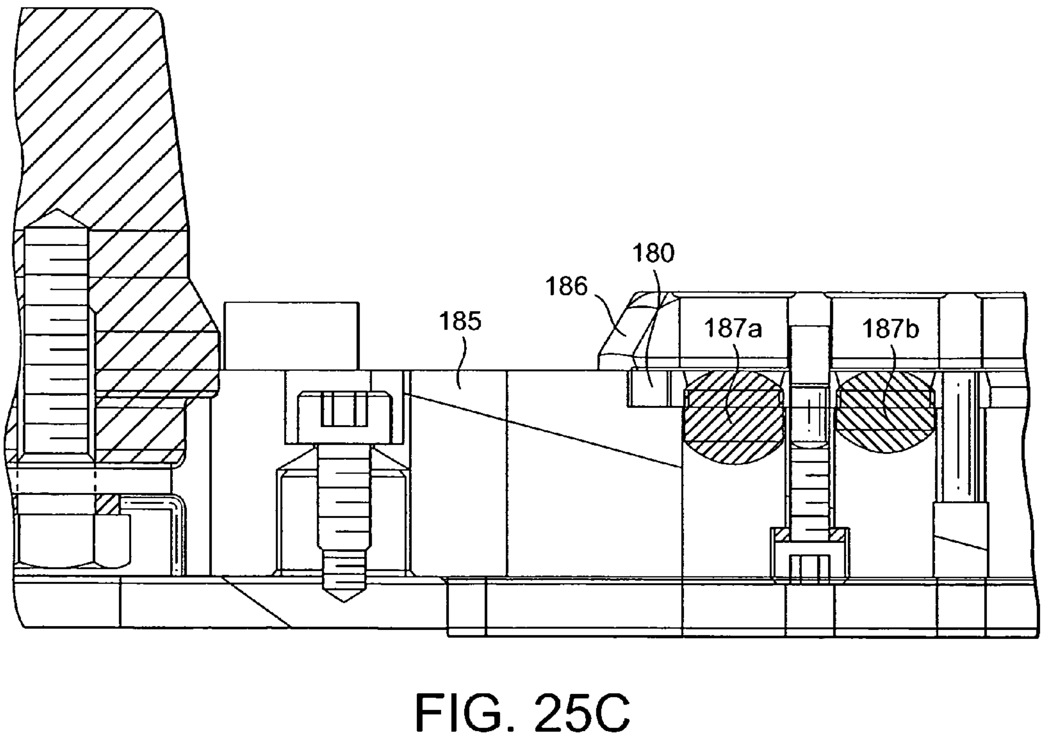
FIG. 25C shows a cross-sectional view of the gasket positioned in a transfer arm with tablets and FIG. 25D-E show cross-sectional views of the platen assembly and the gasket.

In this embodiment the turntable 160 indexing through 90° to process position and a transfer arm rotates through 90° to a position underneath the ironing tool. The platen is lifted out of turntable by the station 3 cam unit for example using a TOX unit, and lower pistons are set at the appropriate operating height using the eccentric cam. The thermoformer unit 100 film lifter lowers to apply second film. A transfer arm assembly raised c-arm to mate with ironing unit using the air spring pneumatic cylinder and film indexes. The thermoformer rotates through 90° to process position, a finger pusher assembly to push tablets pushes tablets into ironing tool. (The tablets can remain in the ironing tool for a period of time, for example 45 seconds, which is just under six cycles of the machine.) A top clamping assembly clamps the thermoforming together and transfer arm assembly lowers c-arm to clear with ironing unit using the air spring pneumatic cylinder and rotates 90° to home position. The film is thermoformed over the half formed tablets and the ironing unit indexed is to next position the top clamping assembly releases and the thermoformer returns to the home position, and finger pusher assembly evacuates the finished tablets from ironing tool and empties the row of cavities ready for a new batch of tablets to be ironed. The transfer arm indexes 90° to the cutting position above the platen, and a pickoff head performs a pick and place operation to take the product out of the machine. The top assembly clamps the c-arm mating with the spring loaded tapered bushed of the lower platen assembly. Finally the cut is executed at the very end of the stroke of the top clamping assembly. The top clamping assembly holds the c-arm, stripper plate 188 assembly and platen together. The stripper plate 188 is to provide a gap between the thermoformer and the partially enrobed slugs to ensure that the thermofomer does not cause damage to the compacted slugs while retaining and heating (i.e. preconditioning) the second film prior to thermoforming the second film onto the partially enrobed slugs. The lower pistons are reset to the maximum height using the eccentric cam, pulling or pushing/lifting the tablets from the lower platen into a silicone gasket contained in the c-arm. The silicone gasket 180 is shown in FIG. 25A-E. The gasket has an array of apertures 182 to receive the compacted powder slugs or tablets. As shown in FIG. 25B the apertures are chambered or tapered (i.e. diameter of aperture 184 tablet enters is, for example, 7.6 mm diameters while the other "top" side of aperture 183 is 6.9 mm diameter). This configuration of the gasket also provides an ironing action on the tablet. The material of the gasket is a material that is flexible material to receive and hold the tablets. The material is also of a food/pharmaceutical grade (e.g. FDA approved) since the gasket is in contact with the tablets. The top clamp assembly holds the c-arm of the transfer arm down whilst the cut tablets are transferred from the platen 20 into the silicon tablet gasket 180, contained in the c-arm, using the lower pistons of the lower platen assembly 20. A tablet with a 4 mm sidewall 187*a* and a table with a 3 mm sidewall 187*b* is shown in the tablet gasket 180 in FIG. 25C.

Figure 25D:
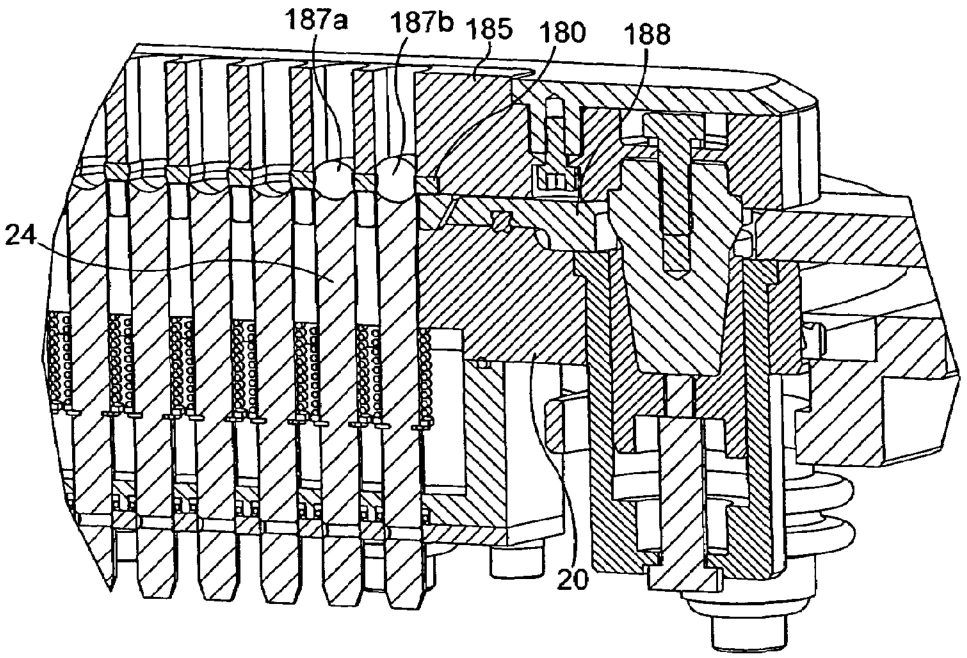
Figure 25E:
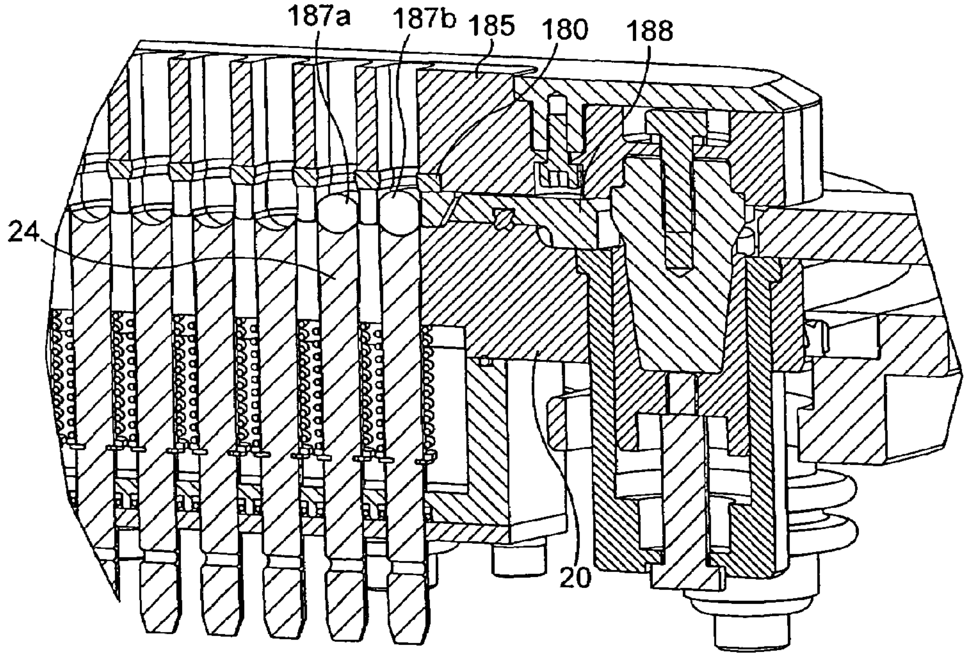

The tablets, partially enrobed compacted slugs or the like may be transferred by the gasket during processing. FIG. 25D shows the transfer arm lowers and second cut tool 186 cuts tablet out of web of second film and FIG. 25E shows the lower piston push tablets into tablet gasket in transfer arm. The top clamping assembly releases the film lifters assemblies strip the waste film from the stripper plate 188 and platen, and the transfer arm lifts the c-arm to clear the film and film lifters, using the air spring pneumatic cylinder. The platen drops back into the turntable accentuating the stripping effect and lower pistons return to home position when the station 3 cam unit is lowered. The transfer arm indexes 90° to the home and the drop c-arm to mid position.

The embodiment is a platen vacuum 150 cleaning station, using airjets and vacuum to dislodge and suck NROBE dust respectively. The turntable 160 indexes through 90° to process position to begin. Then the platen 22 is lifted out of turntable by the station 4 cam unit 170 by pneumatic cylinder. Initially lower pistons 24 remain at home positions, and the vacuum head 152 is lowered to mate with platen. The vacuuming process begins, and the lower pistons are set to upper operating height using the pneumatic cylinder until the vacuuming process ends. The platen drops back into the turntable and lower pistons return to home position when the station 4 cam unit is lowered and the vacuum head is raised.

It will be understood that the processes and apparatus as described above provide advantages. It will be appreciated that specific embodiments of the invention are discussed for illustrative purposes, and various modifications may be made without departing from the scope of the invention as defined by the appended claims.

The invention claimed is:

1. An apparatus for forming a compacted powder slug coated with a film, comprising:

a platen having a pocket for receiving a vacuum formed film into the pocket and receiving a powder; and a mechanical means comprising a compression piston for compacting the powder in said pocket, the compression piston having a front face with a concave recess and a square edge around the circumference of the front face.

2. An apparatus according to claim 1 wherein the pocket has a base formed by a lower piston, the lower piston having a front face with a concave recess and a square edge around the circumference of the front face.

3. An apparatus of claim 2 wherein the front face of the lower piston further comprises at least two apertures to allow a vacuum to be formed in the pocket for vacuum forming the film.

4. An apparatus of claim any one of the preceding claims wherein the platen further comprises an aperture to allow a vacuum to be formed between the platen and the film.

5. An apparatus of claim 4 wherein an array of apertures are formed in the platen around the circumference of the pocket.

6. An apparatus of claim 1, wherein the platen further comprises a raised edge forming the circumference of the pocket.

7. An apparatus of claim 6, wherein the platen further comprises a recessed surface defining the raised edge forming the circumference of the pocket.

8. An apparatus of claim 1, wherein the diametric clearance between the compression piston and the pocket is a fraction of the film thickness.

9. An apparatus of claim 1, wherein the diametric clearance between the compression piston and the pocket is at most 35 micrometers.

10. An apparatus of claim 2 wherein the diametric clearance between the lower piston and the pocket is a fraction of the film thickness.

11. An apparatus of claim 10 wherein the diametric clearance between the lower piston and the pocket is at most 25 micrometers.

12. An apparatus of claim 1, wherein the platen further comprises an array of pockets.

13. An apparatus of claim 1, further comprising a means for pre-conditioning the film for temporarily retaining and heating, the means for pre-conditioning the film comprising a heated plate having a surface with an array of apertures for forming a vacuum between the heated plate and the film.

14. An apparatus of claim 1, further comprising a gasket for receiving and retaining the compacted powder slug to transport and release the compacted powder slug to a desired location.

15. An apparatus as claimed in claim 14 wherein said gasket comprises an aperture with a receiving side for receiving the compacted powder slug and an exit side, the receiving side having a greater diameter than the exit side.

* * * * *

UNITED STATES PATENT AND TRADEMARK OFFICE

CERTIFICATE OF CORRECTION

PATENT NO. : 7,625,622 B2
APPLICATION NO. : 10/949136
DATED : December 1, 2009
INVENTOR(S) : Teckoe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 210 days.

Signed and Sealed this

Second Day of November, 2010

David J. Kappos

*Director of the United States Patent and Trademark Office*